US012025977B1

(12) United States Patent
Engelkemier et al.

(10) Patent No.: US 12,025,977 B1
(45) Date of Patent: Jul. 2, 2024

(54) EFFICIENT SAFETY MECHANISM SELECTION FOR ACHIEVING FUNCTIONAL SAFETY

(71) Applicant: Ethernovia Inc., San Jose, CA (US)

(72) Inventors: Darren S. Engelkemier, Menlo Park, CA (US); Roy T. Myers, Jr., Morgan City, CA (US); Hossein Sedarat, San Jose, CA (US); Ramin Shirani, Morgan Hill, CA (US)

(73) Assignee: Ethernovia Inc., San Jose, CA (US)

( * ) Notice: Subject to any disclaimer, the term of this patent is extended or adjusted under 35 U.S.C. 154(b) by 432 days.

(21) Appl. No.: 17/451,046

(22) Filed: Oct. 15, 2021

Related U.S. Application Data

(60) Provisional application No. 63/092,246, filed on Oct. 15, 2020.

(51) Int. Cl.
G05B 23/02 (2006.01)

(52) U.S. Cl.
CPC ....... *G05B 23/0297* (2013.01); *G05B 23/021* (2013.01); *G05B 23/0237* (2013.01); *G05B 23/0275* (2013.01)

(58) Field of Classification Search
CPC .............. G05B 23/0297; G05B 23/021; G05B 23/0237; G05B 23/0275
See application file for complete search history.

(56) References Cited

U.S. PATENT DOCUMENTS

| 4,967,347 | A | 10/1990 | Smith et al. |
| 10,810,079 | B2 | 10/2020 | Halbert et al. |
| 11,520,963 | B2 * | 12/2022 | Strasser ............. G01R 31/2844 |
| 11,777,835 | B1 * | 10/2023 | Sedarat ................... H04L 43/50 370/252 |
| 11,803,180 | B2 * | 10/2023 | Engelkemier ...... G05B 23/0294 |

(Continued)

FOREIGN PATENT DOCUMENTS

| CN | 107085648 | 8/2017 |
| WO | 2019142484 | 7/2019 |

OTHER PUBLICATIONS

US 2022/0035363 A1, 02/2022, Engelkemier et al. (withdrawn)

(Continued)

*Primary Examiner* — An H Do
(74) *Attorney, Agent, or Firm* — Schwegman Lundberg & Woessner, P.A.

(57) ABSTRACT

Disclosed are systems, methods, and non-transitory computer-readable media for efficient safety mechanism selection for achieving functional safety. A functional safety system automates the process of achieving a target diagnostic coverage level using recursive method to sequentially analyze each layer of a target environment and add additional safety mechanisms if a target diagnostic coverage level is not met. The functional safety system implements the additional safety mechanisms based on a ranking determined based on one or more selected parameters. The parameters may indicate a preference for achieving specified goals, such as higher efficiency, increased coverage, reduced cost, reduced area, and the like. The functional safety system adds the additional safety mechanisms based on the ranking, such as by adding the highest ranked safety mechanism, followed by subsequently ranked safety mechanism.

20 Claims, 12 Drawing Sheets

(56) References Cited

U.S. PATENT DOCUMENTS

| | | | |
|---|---|---|---|
| 2005/0106713 A1 | 5/2005 | Phan et al. |
| 2014/0013182 A1 | 1/2014 | Cheng et al. |
| 2015/0332463 A1 | 11/2015 | Galera et al. |
| 2017/0139761 A1 | 5/2017 | Song et al. |
| 2017/0272102 A1 | 9/2017 | Goldenberg et al. |
| 2018/0322008 A1 | 11/2018 | Chung et al. |
| 2020/0004627 A1 | 1/2020 | Sharon et al. |
| 2020/0043256 A1 | 2/2020 | Rocci et al. |
| 2020/0364958 A1 | 11/2020 | Lewis et al. |
| 2021/0049068 A1 | 2/2021 | Schaefer et al. |

OTHER PUBLICATIONS

"U.S. Appl. No. 17/132,556, Non Final Office Action dated Jun. 16, 2022", 11 pgs.

"U.S. Appl. No. 17/451,051, Non Final Office Action dated Sep. 1, 2022", 10 pgs.

"U.S. Appl. No. 17/451,049, Non Final Office Action dated Sep. 2, 2022", 13 pgs.

"U.S. Appl. No. 17/132,556, Response filed Sep. 16, 22 to Non Final Office Action dated Jun. 16, 2022", 11 pgs.

"U.S. Appl. No. 17/451,051, Response filed Nov. 29, 22 to Non Final Office Action dated Sep. 1, 2022", 11 pgs.

"U.S. Appl. No. 17/451,049, Response filed Dec. 1, 22 to Non Final Office Action dated Sep. 2, 2022", 12 pgs.

Lim, Seung-Ho, "A Stepwise Rate-Compatible LDPC and Parity Management in NAND Flash U Memory-Based Storage Devices", IEEE Access, vol. 8, pp. 162491-162506, (2020), 16 pgs.

"U.S. Appl. No. 17/132,556, Notice of Allowance dated Dec. 21, 2022", 8 pgs.

"U.S. Appl. No. 17/132,556, Corrected Notice of Allowability dated Jan. 5, 2023", 2 pgs.

"U.S. Appl. No. 17/451,049, Notice of Allowance dated Jan. 17, 2023", 11 pgs.

"U.S. Appl. No. 17/451,051, Notice of Allowance dated Jan. 26, 2023", 8 pgs.

Cai, Y., "Error Characterization, Mitigation, and Recovery in Flash-Memory-Based U Solid-State Drives", vol. 105, No. 9, pp. 1666-1704, Sep. 2017, doi:10.1109 JPROC.2017.2713127. (Year: 2017), 39 pgs.

\* cited by examiner

EFFICIENT SAFETY MECHANISM SELECTION FOR ACHIEVING FUNCTIONAL SAFETY

CROSS-REFERENCE TO RELATED APPLICATIONS

The present application claims the benefit of priority of U.S. Provisional Application No. 63/092,246, filed on Oct. 15, 2020, which is incorporated herein by reference in its entirety.

TECHNICAL FIELD

An embodiment of the present subject matter relates generally to functional safety, and more specifically, to efficient safety mechanism selection for achieving functional safety.

BACKGROUND

Safety-critical automotive applications have stringent demands for functional safety and reliability. The International Organization for Standardization (ISO) has established an international standard known as ISO 26262 "Road vehicles—Functional safety." Although ISO 26262 is titled "Road vehicles—Functional safety," it relates to the functional safety of the electrical and electronic systems within vehicles, including the systems as a whole.

ISO 26262 defines four Automotive Safety Integrity Levels (ASILs), spanning from a least stringent safety level defined as ASIL-A to a most stringent safety level defined as ASIL-D. Each ASIL defines a level of safety mechanisms that are required for avoiding an unreasonable residual risk. For example, ASIL-B requires that 90% of faults that can propagate and cause a system failure be detected, whereas the more stringent safety level of ASIL-D requires that 99% of these faults be detected. ASIL-D is targeted for mission critical applications, such as Integrated Circuits (ICs) used for braking, steering, or autonomous driving, that could cause life-threatening to fatal injuries if a failure occurred.

A highly stringent safety level, such as that defined by ASIL-D, generally requires effective diagnostic coverage at all layers (e.g., Intellectual Property (IP) layer, semiconductor layer, software layer, system layer, etc.). Accomplishing this is particularly difficult as current ICs are often comprised of millions of transistors, and many of the IPs, ICs, and/or software are designed "generically" or "out of context." Accordingly, improvements are needed.

BRIEF DESCRIPTION OF THE DRAWINGS

Various ones of the appended drawings merely illustrate example embodiments of the present disclosure and cannot be considered as limiting its scope.

DETAILED DESCRIPTION

Figure 1:
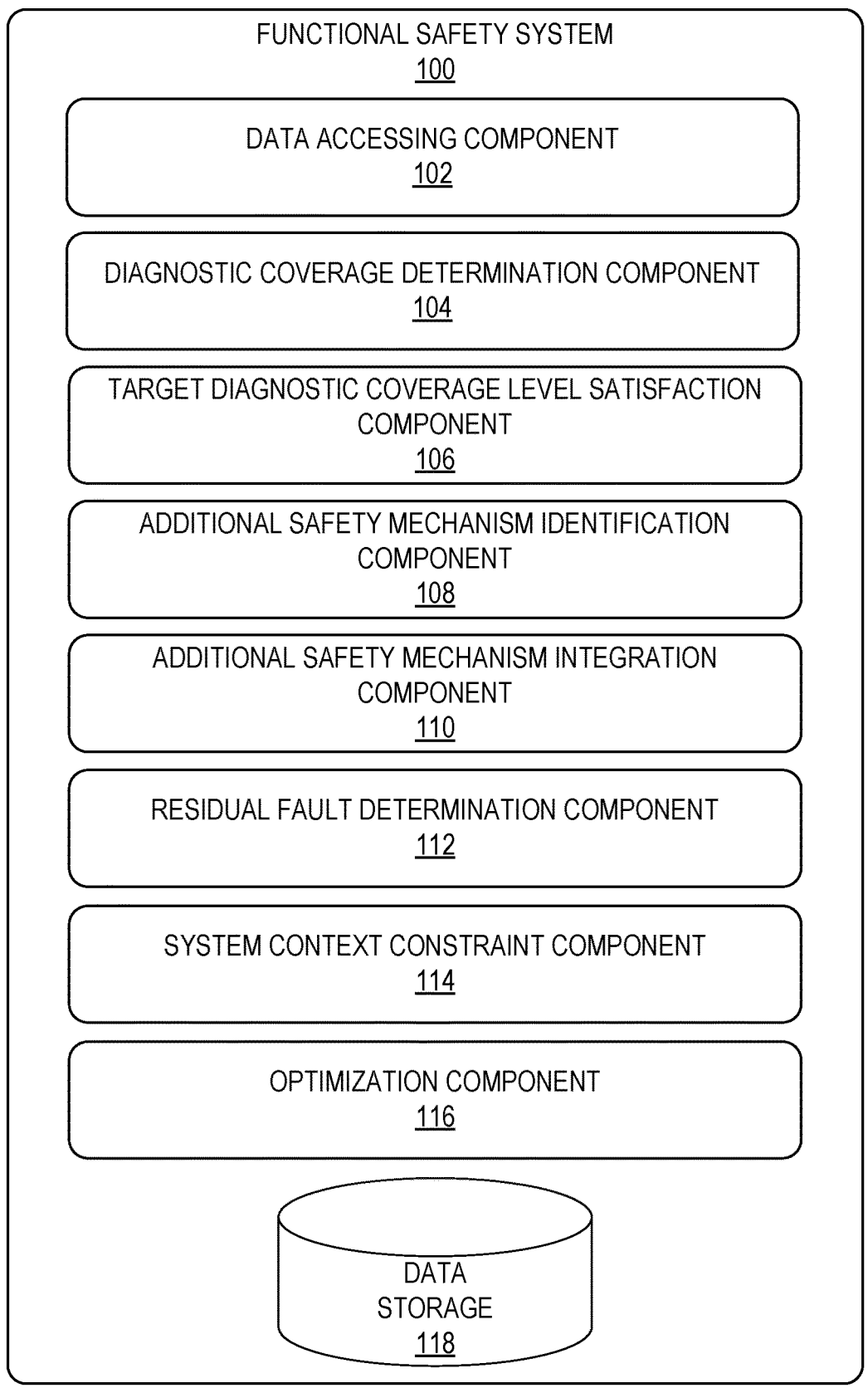
FIG. 1 is a block diagram of a functional safety system, according to certain example embodiments.

In the following description, for purposes of explanation, various details are set forth in order to provide a thorough understanding of some example embodiments. It will be apparent, however, to one skilled in the art, that the present subject matter may be practiced without these specific details, or with slight alterations.

Disclosed are systems, methods, and non-transitory computer-readable media for efficient safety mechanism selection for achieving functional safety. A functional safety system automates the process of achieving a target diagnostic coverage level in a target environment. A diagnostic coverage level describes the effectiveness of included safety mechanisms at detecting faults in the target environment. A safety mechanism is a technical solution implemented by electronic functions or elements, or by other technologies, to detect faults or control failures to achieve or maintain a safe state. The effectiveness of a safety mechanism can be measured using various metrics, such as a single-point fault metric (SPFM), latent (e.g., multi-point) fault metric (LFM), Failure in Time (FIT), as well as a probability of the risk (e.g., probabilistic metrics for hardware failures (PMHF)).

The functional safety system uses a recursive method to sequentially analyze each layer of a target environment starting from a bottom layer (e.g., IP layer) to a top layer (e.g., system layer). For example, the functional safety system determines a realized diagnostic coverage level of a layer (e.g., IP layer) and whether the realized diagnostic coverage level meets a target diagnostic coverage level (e.g., target ASIL). If the realized diagnostic coverage level does not meet the target diagnostic coverage level, the functional safety system attempts to identify and implement additional safety mechanisms to meet the target diagnostic coverage level.

The functional safety system implements the additional safety mechanisms using a process that increases efficiency in achieving the target diagnostic coverage level. In this process, the functional safety system implements additional safety mechanisms at each layer of the target environment based on a ranking of the additional safety mechanisms. For example, the functional safety system identifies a set of additional safety mechanisms that are available at the layer of the target environment and then ranks the additional safety mechanisms based on one or more selected parameters such as coverage effectiveness or efficiency. The parameters may indicate a preference for achieving specified functional safety goals or efficiency such as a higher increased diagnostic coverage or higher diagnostic coverage per a cost parameter (e.g., gate count, area, power, impact to timing) to achieve an optimized and efficient functional safety design. This can result in a higher ASIL level and/or ASIL level while minimizing the cost, area, power impact to the design. The functional safety system adds the additional safety mechanisms based on the ranking, such as by adding the highest ranked safety mechanism, followed by subsequently ranked safety mechanism.

In some embodiments, the functional safety system implements the additional safety mechanisms based on the components (e.g., parts, subparts) of the layer of the target environment. A component of the layer can be a part or subpart of the layer. Examples of parts of the layer include residual inputs, storage elements, processors, finite state machines, interconnects and datapaths, clocking, and the like. Some parts of the layer may include subparts. For example, storage elements may include subparts such as SRAM, regfiles, TCAM, FIFOs, configuration registers, and the like.

The functional safety system categorizes the additional safety mechanisms available at each layer of the target environment into separate groups of safety mechanisms that correspond to the separate components (e.g., parts, subparts) identified in the layer of the target environment. The functional safety system ranks each of these groups of additional safety mechanisms separately and then applies each group of additional safety mechanisms to the layer of the target environment based on its individual ranking.

Utilizing groups of additional safety mechanisms corresponding to the components prioritizes implementation of the additional safety mechanisms that are most effective and/or efficient at increasing the diagnostic coverage of the specific layer. As a result, the additional safety mechanisms that are most effective and/or efficient at increasing the diagnostic coverage of the components included in specific layer are applied first, thereby increasing the efficiency at which the functional safety system is able to achieve the target diagnostic coverage level.

In some embodiments, the functional safety system may additionally optimize the safety mechanisms that have been implemented at a layer of the target environment. For example, the functional safety system may remove safety mechanism that provide overlapping coverage, ineffective safety mechanisms, and/or safety mechanisms that provide coverage beyond the target diagnostic coverage level.

If the target diagnostic coverage level is not achieved by adding additional safety mechanisms at the layer of the target environment, the functional safety system attempts to achieve the target diagnostic coverage level at the next layer (e.g., semiconductor layer) in the target environment. For example, the functional safety system may analyze the next layer based on the residual faults from the lower layer to determine whether the realized diagnostic coverage level of the next layer meets the target diagnostic coverage level, whether additional safety mechanisms can be added to meet the target diagnostic coverage level, and the like.

Residual faults at any layer of the target environment affect the achieved diagnostic coverage level of the target environment as a whole. Residual faults that occur at one layer may be easier to address at a subsequent layer, such as in software or through an outside redundant mechanism. Passing fault data describing residual faults to the analysis of the higher layers may eliminate the need to reanalyze the faults at the layer thereby potentially increasing the speed and ease at which the target diagnostic coverage level is achieved. An example is a lock step processor. An individual processor may not meet a target diagnostic coverage level, however, by instantiating a second or redundant processer with a voting or checking mechanism, the target diagnostic coverage level for the target environment can be achieved even though the individual processor by itself does not meet the target diagnostic coverage level.

The functional safety system repeats this process until the top layer (e.g., system layer) of the target environment is reached. At the top layer, the context of the target environment, such the requirements, design and application of the target environment, are known. The functional safety system uses this context when analyzing the top layer. For example, the functional safety system uses the context of the target environment to constrain the scope of the diagnostic coverage analysis to a particular application. That is, the functional safety system may be able to reduce the scope of the coverage analysis by eliminating portions of the function or IP that are not needed within the context of the target environment.

The functional safety system may also apply the context of the target environment to reanalyze the lower layers as needed. For example, if the target diagnostic coverage level is not achieved at the top layer, the functional safety system may apply the context of the target environment to lower layers along with the residual faults in an attempt to achieve the target diagnostic coverage level. That is, the functional safety system uses the context of the target environment to constrain the scope of the diagnostic coverage analysis at a lower layer based on the particular application.

The recursive system layer analysis used by the functional safety system simplifies the technically difficult process of complying with functional safety requirements and is particularly helpful when using components (e.g., IPs, ICs, software) that were designed "generically" or "out of context." Generic and Safety Element out of Context (SEooC) components are components that are offered "off the shelf" to be used in a variety of applications. While use of generic and/or SEooC components decreases the time and cost associated with development, these components are not developed in the context of a particular system or vehicle. That is, the components are designed without knowledge of the specific requirements, design, and/or application of the final target environment. Accordingly, complying with stringent functional safety requirement with the use of generic and/or SEooC components can be highly difficult.

FIG. 1 is block diagram of a functional safety system 100, according to certain example embodiments. To avoid obscuring the inventive subject matter with unnecessary detail, various functional components (e.g., modules, mechanisms, devices, nodes, etc.) that are not germane to conveying an understanding of the inventive subject matter have been omitted from FIG. 1. However, a skilled artisan will readily recognize that various additional functional components may be supported by the functional safety system 100 to facilitate additional functionality that is not specifically described herein.

The functional safety system 100 is one or more computing devices configured to automate the process of achieving a target diagnostic coverage level in a target environment.

Figure 12:
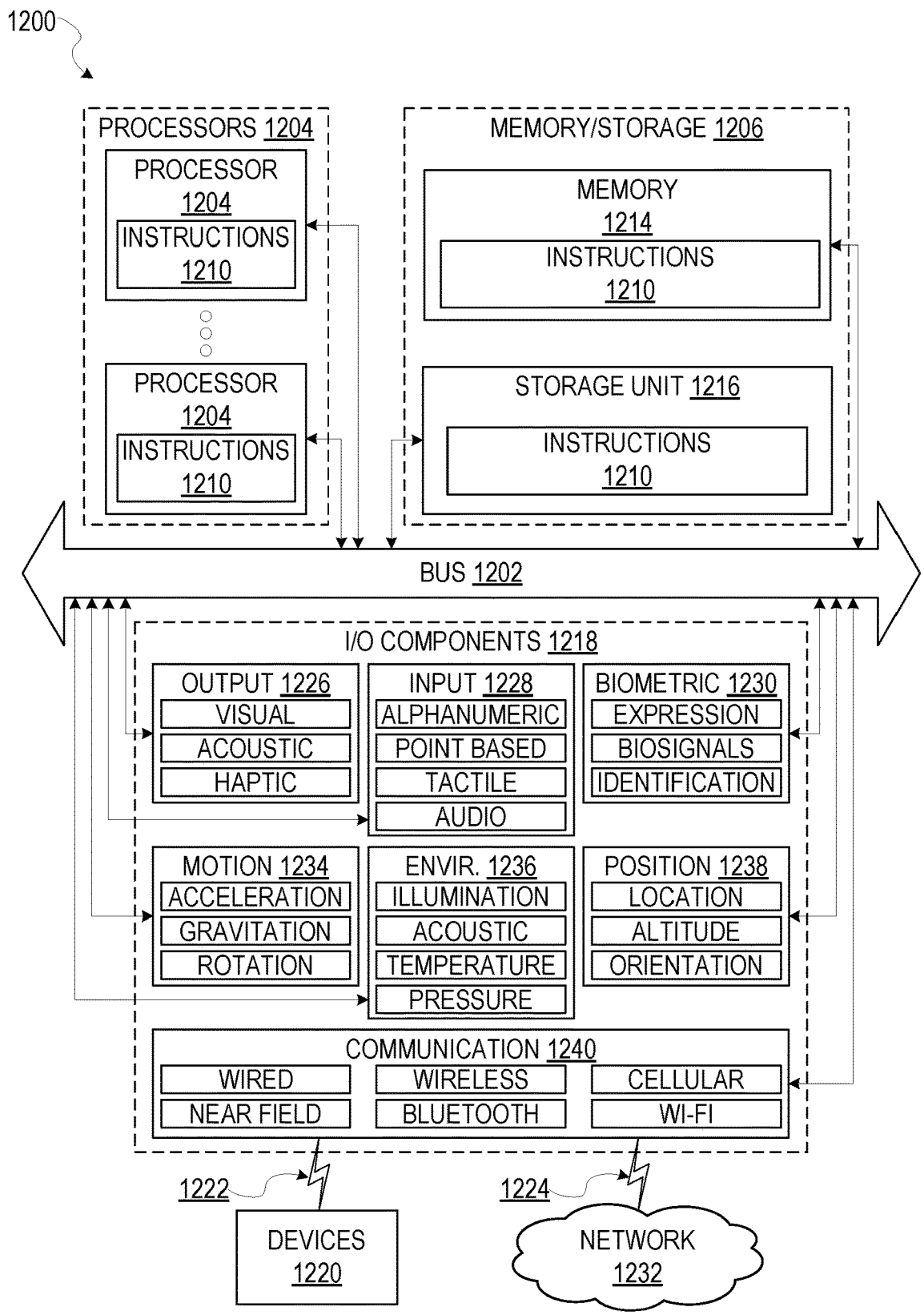
FIG. 12 is a block diagram illustrating components of a machine, according to some example embodiments, able to read instructions from a machine-readable medium (e.g., a machine-readable storage medium) and perform any one or more of the methodologies discussed herein.

The functional safety system 100 may be implemented using any of a variety of types of computing devices, such as computing devices including some or all of the features, components, and peripherals of the machine 1200 shown in FIG. 12.

As shown, the functional safety system 100 includes a data accessing component 102, a diagnostic coverage determination component 104, a target diagnostic coverage level satisfaction component 106, an additional safety mechanism identification component 108, an additional safety mechanism integration component 110, a residual fault determination component 112, a system context constraint component 114, an optimization component 116, and a data storage 118.

The data accessing component 102 accesses data used by the functional safety system 100 to automate the process of achieving a target diagnostic coverage level in a target environment. For example, the data accessing component 102 accesses data describing the target environment, including sets of data describing the various layers of the target environment (e.g., IP layer, semiconductor layer, software layer, system layer, etc.). The data describing the target environment may describe the structure and behavior of the various electronic circuits and/or software in the target environment. For example, the data may include a hardware description language (HDL) description of the target environment at the Register Transfer Level (RTL) that provides a precise and formal description of the various electronic circuits in the target environment. The HDL description allows for an automated analysis and simulation of the various electronic circuits as well as generation of a netlist describing the connectivity of the various electronic circuits. The data describing the target environment may also include the schematics of boards, other semiconductors, Electronic Control Units (ECUs), or electronics on the boards or modules, or at system or network levels, as well as software or programs used by ECUs or processors.

The data accessing component 102 also accesses data defining a target diagnostic coverage level for the target environment. For example, the target diagnostic coverage level may be defined by an ASIL, such as ASIL-D. The data accessing component 102 may access the data from the data storage 118 and provide the accessed data to the other components of the functional safety system 100.

The diagnostic coverage determination component 104 determines a realized diagnostic coverage level of a layer of the target environment. The realized diagnostic coverage level of a layer of the target environment indicates the effectiveness of the implemented safety mechanisms at detecting faults at the layer of the target environment. For example, the realized diagnostic coverage level may be a value representing a percentage of faults that can be detected by the included safety mechanisms.

The diagnostic coverage determination component 104 determines a realized diagnostic coverage level based on a set of data describing the layer of the target environment and, optionally, data describing residual faults at a lower layer of the target environment and/or the context of the target environment. The diagnostic coverage determination component 104 may determine a realized diagnostic coverage level using various techniques. For example, the diagnostic coverage determination component 104 can identify the safety mechanisms implemented at the layer by using machine learning/artificial intelligence techniques based on known standard functional safety coverage mechanisms, patterns, and key words or being supplied a list of the layer's functional safety mechanisms and locations. The diagnostic coverage determination component 104 can determine the realized diagnostic coverage level based on the identified safety mechanisms implemented at the layer using, for example, a formal cone of logic, by insertion of faults to determine if the safety mechanisms can detect the inserted faults, inputted coverage file, and/or other automated techniques.

The target diagnostic coverage level satisfaction component 106 determines whether the target diagnostic coverage level has been satisfied. For example, the target diagnostic coverage level satisfaction component 106 compares the realized diagnostic coverage level determined by the diagnostic coverage determination component 104 to the target diagnostic coverage level. If the realized diagnostic coverage level meets or exceeds the target diagnostic coverage level, the target diagnostic coverage level satisfaction component 106 determines that the target diagnostic coverage level has been satisfied (e.g., the functional safety requirement has been met). Alternatively, if the realized diagnostic coverage level does not meet or exceeds the target diagnostic coverage level (e.g., the realized diagnostic coverage level is less than the target diagnostic coverage level), the target diagnostic coverage level satisfaction component 106 determines that the target diagnostic coverage level has not been satisfied (e.g., the functional safety requirement has not been met).

The additional safety mechanism identification component 108 identifies additional safety mechanisms to implement to a given layer to meet the target diagnostic coverage level. For example, the target diagnostic coverage level satisfaction component 106 may notify the additional safety mechanism identification component 108 upon determining that the realized diagnostic coverage level does not meet or exceeds the target diagnostic coverage level at the layer. In response, the additional safety mechanism identification component 108 identifies additional safety mechanisms to meet the target diagnostic coverage level, if available.

The additional safety mechanism identification component 108 may identify the additional safety mechanisms using various techniques. In some embodiments, the additional safety mechanism identification component 108 may use machine learning/artificial intelligence techniques to identify the additional safety mechanisms. For example, a machine learning model may be trained based on data sets defining target environments that satisfy strict diagnostic coverage levels. The additional safety mechanism identification component 108 may use data defining a target environment, layer of a target environment, residual faults at a lower layer, and/or the context of the target environment as input into the machine learning model. In turn, the machine learning model may provide an output identifying the safety mechanisms with the highest likelihood of increasing diagnostic coverage level of the layer.

As another example, the additional safety mechanism identification component 108 may identify the additional safety mechanism using pattern matching techniques, such as by matching safety mechanism to known patterns or individual components included in the layer. For example, the additional safety mechanism identification component 108 may maintain a list of additional functional safety mechanisms and locations and/or components to which the safety mechanisms can be effectively implemented. Accordingly, the additional safety mechanism identification component 108 identifies components that are included in the layer of the target environment and then identifies the additional functional safety mechanisms mapped to the identified components in the list of additional functional safety mechanisms.

The additional safety mechanism identification component 108 ranks the additional safety mechanisms based on one or more selected parameters. The parameters may indicate a preference for achieving specified goals, such as higher efficiency (e.g., coverage versus cost), increased coverage, reduced cost, reduced area, and the like. In some embodiments, the parameters may indicate weight values to apply to each of the specified goals. For example, the parameters may indicate a higher preference towards a specified goal, such as increased coverage, resulting in a higher weight being applied to the specified goal when ranking the additional safety mechanisms. Alternatively, or additionally, the parameters may indicate a lower preference towards a specified goal, such as reducing area, resulting in a lower weight being applied to the specified goal when ranking the additional safety mechanisms. The cost associated with an additional safety mechanism may be based on one or more factors, such as power consumption, physical size, gate count, clock period increase, and the like.

In some embodiments, the additional safety mechanism identification component 108 determines a single ranking for each of the additional safety mechanisms identified for the layer. Alternatively, in some embodiments, the additional safety mechanism identification component 108 may rank groups of the additional safety mechanisms separately. For example, the additional safety mechanism identification component 108 categorizes the additional safety mechanisms available at each layer of the target environment into separate groups of additional safety mechanisms that correspond separate components identified in the layer of the target environment. The additional safety mechanism identification component 108 may then rank each group of additional safety mechanisms separately. The additional safety mechanism identification component 108 may rank each group of additional safety mechanisms based on the same selected parameters or based on different parameters selected for each of the components. This allows the additional safety mechanisms to be prioritized based on the specific component within the target environment to which the additional safety mechanism will be applied.

The additional safety mechanism integration component 110 integrates the identified safety mechanisms to the layer of the target environment in an attempt to increase achieve the target diagnostic coverage level. The safety mechanisms may be implemented in hardware or software. Further, the safety mechanisms may be implemented internal or external to the layer (e.g., IP). To implement the additional safety mechanisms, the additional safety mechanism integration component 110 may update the data describing the target environment, such as the HDL description, schematics, and/or software. For example, the additional safety mechanism integration component 110 accesses the data describing the target environment (e.g., HDL description, schematics, software) from the data storage 118 and updates the data based on the additional safety mechanisms. The updated data may then be accessed by the other components of the functional safety system 100, such as by the data accessing component 102 to perform a subsequent diagnostic coverage analysis.

The additional safety mechanism integration component 110 integrates the additional safety mechanisms based on the ranking determined by the additional safety mechanism identification component 108. For example, the additional safety mechanism integration component 110 may initially add a set of one or more of the highest ranked safety mechanisms, followed by subsequently ranked safety mechanisms. In embodiments in which the additional safety mechanisms are categorized and ranked separately, the additional safety mechanism integration component 110 may add the additional safety mechanisms in each group based on the individual ranking determined for the particular group of additional safety mechanisms. Further, the order in which the additional safety mechanism integration component 110 adds each group of additional safety mechanisms may be based on a ranking of the components corresponding to the groups. For example, the components may be ranked based on an effectiveness and/or efficiency of increase in the realized diagnostic coverage level by implementing additional safety mechanisms to the component. As a result, the additional safety mechanism integration component 110 will add the group of additional safety mechanisms corresponding to the highest ranked component first, followed by the subsequently ranked components.

The functional safety system 100 may repeatedly perform subsequent diagnostic coverage analysis at a layer (e.g., determine the realized diagnostic coverage level of the layer, determine whether the realized diagnostic coverage level meets the target diagnostic coverage level, and identify/implement additional safety mechanisms) until the realized diagnostic coverage level meets the target diagnostic coverage level or an exit condition has been triggered. For example, the exit condition may be a specified time period elapsing (e.g., a timeout), a determination that all additional safety mechanisms have been exhausted, and/or that addition of additional safety mechanisms will not increase the diagnostic coverage level beyond a predetermined threshold.

The residual fault determination component 112 generates fault data describing the residual faults of the layer. The fault data can be used to assess whether the residual faults may be addressed at a subsequent higher layer in the computing system. The fault data may describe the residual faults, impact of the residual faults, and how the residual faults may be addressed at a higher layer in either hardware and/or software.

As explained earlier, in some situations the system context of the target environment is known and can be used to achieve the target diagnostic coverage level. For example, at the top layer of the target environment, the context of the target environment, such the requirements, design and application of the target environment, are known. The system context can be used to limit the scope of a diagnostic coverage analysis based on the particular application. For example, the system context can be used to limit the scope of the diagnostic coverage analysis to the portions of the target environment that are used within the given application.

The system context constraint component 114 determines the limited scope of the diagnostic coverage analysis based on the system context. For example, the system context constraint component 114 identifies any functions and/or IP at that layer that are not needed within the known system context of the target environment. The system context constraint component 114 may provide data describing the limited scope of the diagnostic coverage analysis to the other components of the functional safety system 100. For example, the system context constraint component 114 may provide the data describing the limited scope of the diagnostic coverage to the diagnostic coverage determination component 104, a target diagnostic coverage level satisfaction component 106, and/or the additional safety mechanism identification component 108 for use during the diagnostic coverage analysis.

The optimization component 116 may optionally be used to optimize the safety mechanisms that have been implemented at a layer of the target environment. For example, the optimization component 116 may remove safety mechanism that provide overlapping coverage, ineffective safety mechanisms, and/or safety mechanisms that provide coverage beyond the target diagnostic coverage level. In some embodiments, the optimization component 116 may rank the safety mechanisms that have been implemented at a layer of the target environment based on a set of parameters and removes the safety mechanisms from the layer of the target environment based on the ranking. For example, the optimization component 116 may remove the lowest ranked safety mechanisms.

Figure 2:
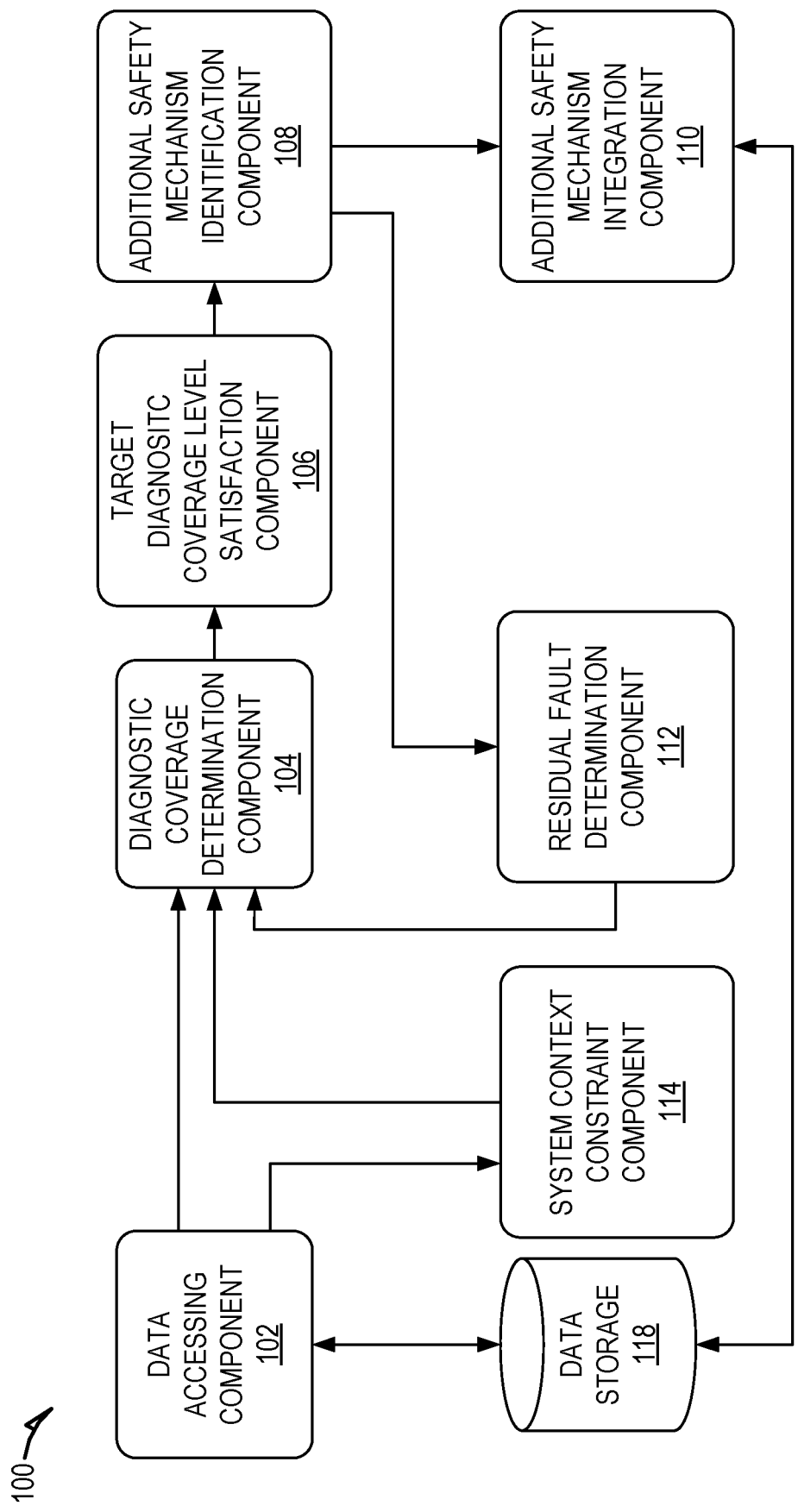
FIG. 2 is a block diagram showing communication signaling within a functional safety system, according to some example embodiments.

FIG. 2 is a block diagram showing communication signaling within a functional safety system 100, according to some example embodiments. As shown, the data accessing component 102 communicates with the data storage 118, system context constraint component 114 and the diagnostic coverage determination component 104.

The data accessing component 102 communicates with the data storage 118 to access data such as data describing the various layers of the target environment (e.g., HDL description) and the target diagnostic coverage level of the target environment. The data accessing component 102 provides data to the diagnostic coverage determination component 104 and the system context constraint component 114. For example, the data accessing component 102 provides the diagnostic coverage determination component 104 with the HDL description and the target diagnostic coverage level for use during the diagnostic coverage analysis.

The data accessing component 102 may also provide the system context constraint component 114 with the data describing the top layer of the target environment and/or other data providing the system context of the target environment. The system context constraint component 114 uses the received data to determine the limited scope of the diagnostic coverage analysis based on the system context. The system context constraint component 114 provides the limited scope of the diagnostic coverage analysis to the diagnostic coverage determination component 104.

The diagnostic coverage determination component 104 receives data from the data accessing component 102, the system context constraint component 114 and the residual fault determination component 112. The diagnostic coverage determination component 104 uses the received data during the diagnostic coverage analysis. For example, the diagnostic coverage determination component 104 receives data describing a layer of the target environment and/or the target diagnostic coverage level from the data accessing component 102. The diagnostic coverage determination component 104 may also optionally receive data describing the limited scope of the diagnostic coverage analysis from the system context constraint component 114 and/or fault data describing residual faults of a layer from the residual fault determination component 112. For example, the system context constraint component 114 provides data to the diagnostic coverage determination component 104 when the system context of the target environment is known (e.g., when analyzing the top layer or after analyzing the top layer). Similarly, the residual fault determination component 112 provides the diagnostic coverage determination component 104 when a residual fault exists from a lower layer of the target environment.

The diagnostic coverage determination component 104 uses the received data to determine the realized diagnostic coverage of the layer of the target environment. The diagnostic coverage determination component 104 may then provide the realized diagnostic coverage to the target diagnostic coverage level satisfaction component 106, which determines whether the target diagnostic coverage level has been satisfied.

The target diagnostic coverage level satisfaction component 106 can communicate with the additional safety mechanism identification component 108. For example, the target diagnostic coverage level satisfaction component 106 may notify the additional safety mechanism identification component 108 that the target diagnostic coverage level has not been satisfied. In turn the, the additional safety mechanism identification component 108 can identify additional safety mechanisms and/or determine if an exit condition has been triggered.

The additional safety mechanism identification component 108 communicates with the additional safety mechanism integration component 110 and the residual fault determination component 112. For example, the additional safety mechanism identification component 108 provides the additional safety mechanism integration component 110 with data identifying additional safety mechanisms to be implemented. In turn, the additional safety mechanism integration component 110 updates the data describing the target environment. For example, the additional safety mechanism integration component 110 communicates with the data storage 118 to access and update the data describing the target environment (e.g., HDL description, schematics, software).

The additional safety mechanism identification component 108 may communicate with the residual fault determination component 112 in the event that an exit trigger has been satisfied. This may cause the residual fault determination component 112 to determine fault data describing any residual faults at the layer of the target environment. The residual fault determination component 112 may provide the fault data to the diagnostic coverage determination component 104 for use when analyzing a subsequent layer of the target environment.

Figure 3:
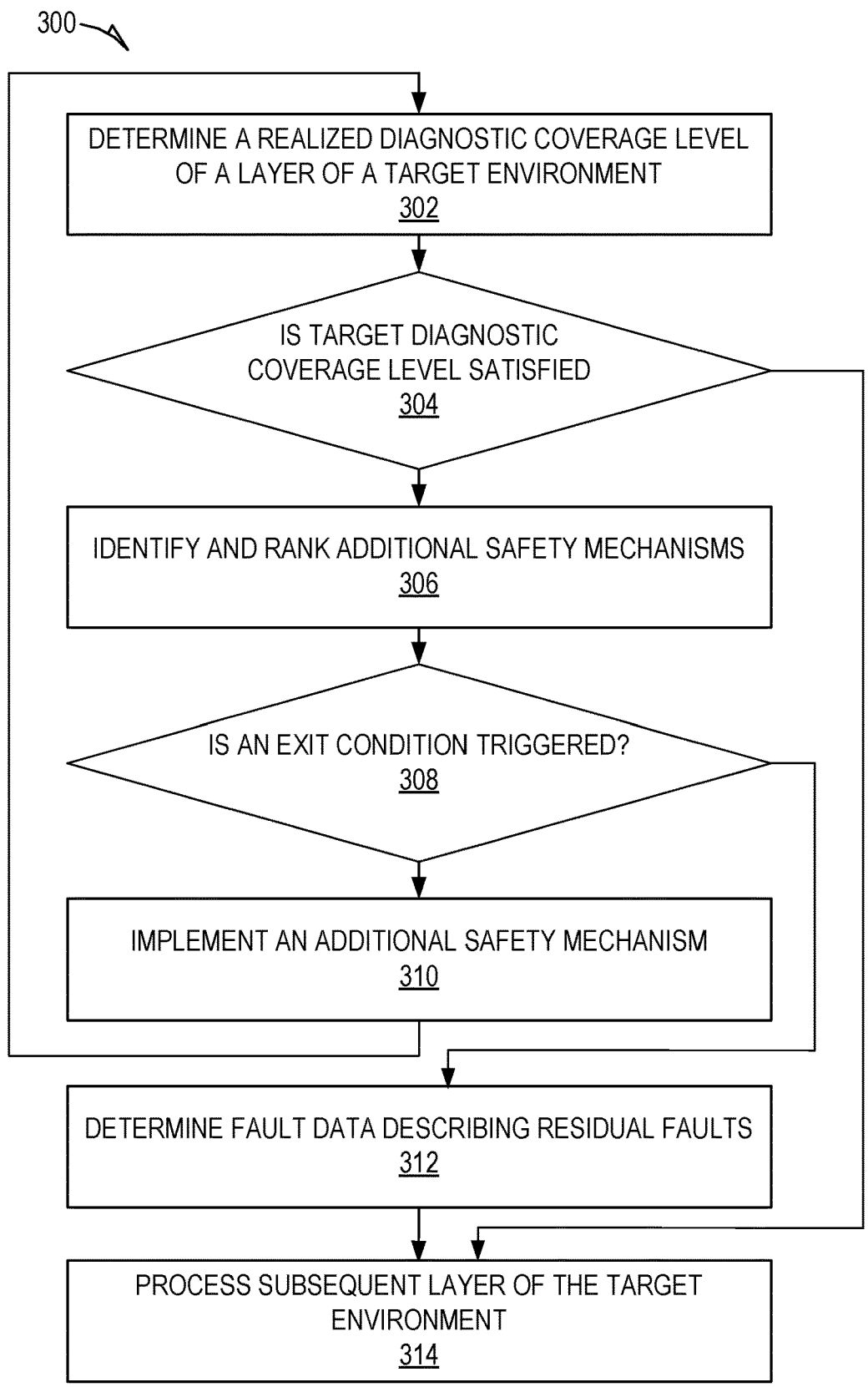
FIG. 3 is a flowchart showing a method for a recursive system layer analysis for achieving functional safety, according to some example embodiments.

FIG. 3 is a flowchart showing a method 300 for a recursive system layer analysis for achieving functional safety, according to some example embodiments. The method 300 may be embodied in computer readable instructions for execution by one or more processors such that the operations of the method 300 may be performed in part or in whole by the functional safety system 100; accordingly, the method 300 is described below by way of example with reference to the functional safety system 100. However, it shall be appreciated that at least some of the operations of the method 300 may be deployed on various other hardware and/or software configurations and the method 300 is not intended to be limited to the functional safety system 100.

At operation 302, the diagnostic coverage determination component 104 determines a realized diagnostic coverage level of a layer of a target environment. The realized diagnostic coverage level of a layer of the target environment indicates the effectiveness of the implemented safety mechanisms at detecting faults at the layer of the target environment. For example, the realized diagnostic coverage level may be a value representing a percentage of faults that can be detected by the included safety mechanisms.

The diagnostic coverage determination component 104 determines a realized diagnostic coverage level based on a set of data describing the layer of the target environment and, optionally, data describing residual faults at a lower layer of the target environment and/or the context of the target environment. The diagnostic coverage determination component 104 may determine a realized diagnostic coverage level using various techniques. For example, the diagnostic coverage determination component 104 can identify the safety mechanisms implemented at the layer by using machine learning/artificial intelligence techniques based on known standard functional safety coverage mechanisms, patterns, and key words or being supplied a list of the layer's functional safety mechanisms and locations. The diagnostic coverage determination component 104 can determine the realized diagnostic coverage level based on the identified safety mechanisms implemented at the layer using, for example, a formal cone of logic, by insertion of faults to determine if the safety mechanisms can detect the inserted faults, inputted coverage file, and/or other automated techniques.

At operation 304, the target diagnostic coverage level satisfaction component 106 determines whether a target diagnostic coverage level is satisfied. For example, the target diagnostic coverage level satisfaction component 106 compares the realized diagnostic coverage level determined by the diagnostic coverage determination component 104 to the target diagnostic coverage level.

If the realized diagnostic coverage level meets or exceeds the target diagnostic coverage level, the target diagnostic coverage level satisfaction component 106 determines that the target diagnostic coverage level has been satisfied (e.g., the functional safety requirement has been met) and the method 300 continues to operation 314, at which the functional safety system 100 processes a subsequent layer of the target environment.

Alternatively, if the realized diagnostic coverage level does not meet or exceed the target diagnostic coverage level (e.g., the realized diagnostic coverage level is less than the target diagnostic coverage level), the target diagnostic coverage level satisfaction component 106 determines that the target diagnostic coverage level has not been satisfied (e.g., the functional safety requirement has not been met) and the method 300 continues to operation 306.

At operation 306, the additional safety mechanism identification component 108 identifies and ranks additional safety mechanisms. The additional safety mechanism identification component 108 may identify the additional safety mechanisms using various techniques. In some embodiments, the additional safety mechanism identification component 108 may use machine learning/artificial intelligence techniques to identify the additional safety mechanisms. For example, a machine learning model may be trained based on data sets defining target environments that satisfy strict diagnostic coverage levels. The additional safety mechanism identification component 108 may use data defining a target environment, layer of a target environment, residual faults at a lower layer, and/or the context of the target environment as input into the machine learning model. In turn, the machine learning model may provide an output identifying the safety mechanisms with the highest likelihood of increasing diagnostic coverage level of the layer.

As another example, the additional safety mechanism identification component 108 may identify the additional safety mechanism using pattern matching techniques, such as by matching safety mechanism to known patterns or individual components included in the layer. For example, the additional safety mechanism identification component 108 may maintain a list of additional functional safety mechanisms and locations and/or components to which the safety mechanisms can be effectively implemented.

The additional safety mechanism identification component 108 ranks the additional safety mechanisms based on one or more selected parameters. The parameters may indicate a preference for achieving specified goals, such as higher efficiency (e.g., coverage versus cost), increased coverage, reduced cost, reduced area, and the like. In some embodiments, the parameters may indicate weight values to apply to each of the specified goals. For example, the parameters may indicate a higher preference towards a desired goal, such as increased coverage, resulting in a higher weight being applied to this goal when ranking the additional safety mechanisms. Alternatively, or additionally, the parameters may indicate a lower preference towards another desired goal, such as reducing area, resulting in a lower weight being applied to this goal when ranking the additional safety mechanisms. The cost associated with an additional safety mechanism may be based on one or more factors, such as power consumption, physical size, gate count, clock period increase, and the like.

In some embodiments, the additional safety mechanism identification component 108 determines a single ranking for each of the additional safety mechanisms identified for the layer. Alternatively, in some embodiments, the additional safety mechanism identification component 108 may rank groups of the additional safety mechanisms separately. For example, the additional safety mechanism identification component 108 categorizes the additional safety mechanisms available at each layer of the target environment into separate groups of additional safety mechanisms that correspond separate components identified in the layer of the target environment. The additional safety mechanism identification component 108 may then rank each group of additional safety mechanisms separately. The additional safety mechanism identification component 108 may rank each group of additional safety mechanisms based on the same selected parameters or based on different parameters selected for each of the components. This allows the additional safety mechanisms to be prioritized based on the specific component within the target environment to which the additional safety mechanism will be applied.

At operation 308, the additional safety mechanism identification component 108 determines whether an exit condition has been triggered. For example, the exit condition may be a specified time period elapsing (e.g., a timeout), a determination that all additional safety mechanisms have been exhausted, and/or that addition of additional safety mechanism will not increase the diagnostic coverage level beyond a predetermined threshold (e.g., effectiveness level).

If the additional safety mechanism identification component 108 determines that an exit condition has not been triggered, the method 300 continues to operation 310, where the additional safety mechanism integration component 110 implements additional safety mechanisms.

The additional safety mechanism integration component 110 integrates the additional safety mechanisms based on the ranking determined by the additional safety mechanism identification component 108. For example, the additional safety mechanism integration component 110 may initially add one or more of the highest ranked safety mechanisms, followed by subsequently ranked safety mechanism. In embodiments in which the additional safety mechanisms are categorized into groups and ranked separately, the additional safety mechanism integration component 110 may add additional safety mechanisms from each group based on the individual ranking determined for the particular group of additional safety mechanisms. Further, the order in which the additional safety mechanism integration component 110 adds each group of additional safety mechanisms may be based on a ranking. For example, the groups of additional safety mechanisms may be ranked based on the components corresponding to each group. As a result, the additional safety mechanism integration component 110 will add the group of additional safety mechanisms corresponding to the higher ranked component first, followed by the subsequently ranked components.

To implement the additional safety mechanisms, the additional safety mechanism integration component 110 updates the data describing the target environment. For example, the additional safety mechanism integration component 110 accesses the data describing the target environment from the data storage 118 and updates the data describing the target environment based on one or more of additional safety mechanisms. The updated data describing the target environment may then be accessed by the other components of the functional safety system 100, such as by the data accessing component 102 to perform a subsequent diagnostic coverage analysis.

The method then returns to operation 302 where the diagnostic coverage analysis is repeated based on the layer implemented with the additional safety mechanisms.

If at operation 308, the additional safety mechanism identification component 108 determines that an exit condition has been triggered, the method 300 continuation to operation 312, where the residual fault determination component 112 determines fault data describing residual faults. The fault data can be used to assess whether the residual faults may be addressed at a subsequent higher layer in the computing system. The fault data may describe the residual faults, impact of the residual faults, and how the residual faults may be addressed at a higher layer.

At operation 314, the functional safety system 100 processes a subsequent layer of the target environment. For example, the functional safety system 100 may process a higher layer in the target environment. Alternatively, if the layer is a top layer in the target environment, the functional safety system 100 may process a lower layer of the target environment determined to be a source of a residual fault. For example, the functional safety system 100 may reprocess a lower layer based on the system context of the target environment (e.g., as described in relation to FIG. 6).

Figure 4:
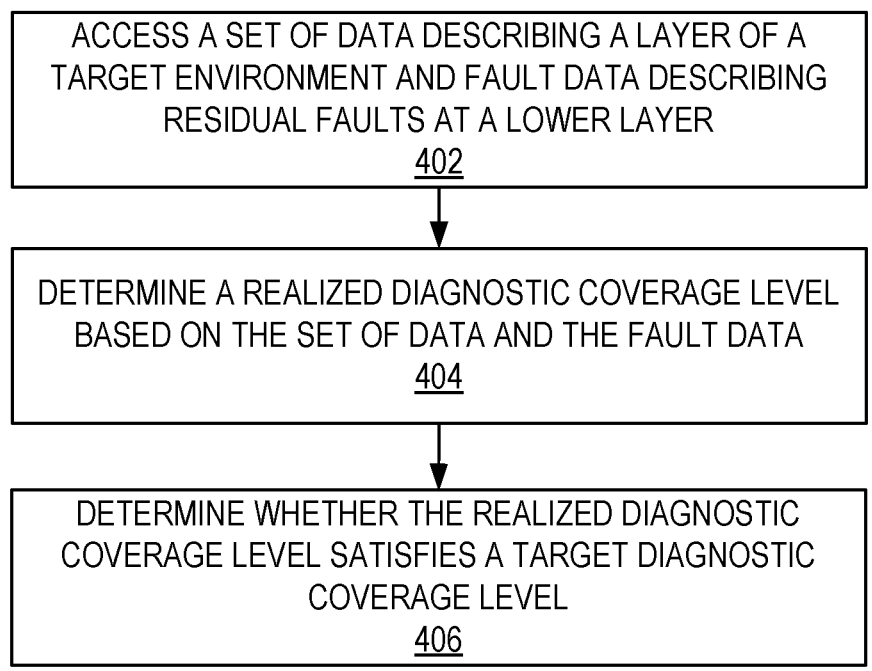
FIG. 4 is a flowchart showing a method for determining a realized diagnostic coverage level, according to some example embodiments.

FIG. 4 is a flowchart showing a method 400 for determining a realized diagnostic coverage level, according to some example embodiments. The method 400 may be embodied in computer readable instructions for execution by one or more processors such that the operations of the method 400 may be performed in part or in whole by the functional safety system 100; accordingly, the method 400 is described below by way of example with reference to the functional safety system 100. However, it shall be appreciated that at least some of the operations of the method 400 may be deployed on various other hardware and/or software configurations and the method 400 is not intended to be limited to the functional safety system 100.

At operation 402, the data accessing component 102 accesses a set of data describing a layer of a target environment and fault data describing residual faults at a lower layer. The data describing the target environment may describe the structure and behavior of the various electronic circuits in the target environment. For example, the data may include a hardware description language (HDL) description of the target environment at the Register Transfer Level (RTL) that provides a precise and formal description of the various electronic circuits in the target environment. The HDL description allows for an automated analysis and simulation of the various electronic circuits as well as generation of a netlist describing the connectivity of the various electronic circuits.

The data accessing component 102 also accesses data defining a target diagnostic coverage level for the target environment. For example, the target diagnostic coverage level may be defined by an ASIL, such as ASIL-D. The data accessing component 102 may access the data from the data storage 118 and provide the accessed data to the other components of the functional safety system 100.

The fault data is accessed from the residual fault determination component 112. The fault data describes the residual faults from the layer. The fault data can be used to assess whether the residual faults may be addressed at a subsequent higher layer in the computing system. The fault data may describe the residual faults, impact of the residual faults, and how the residual faults may be addressed at a higher layer.

At operation 404, the diagnostic coverage determination component 104 determines a realized diagnostic coverage level based on the set of data and the fault data. In some embodiments, the diagnostic coverage determination component 104 may also determine the realized diagnostic coverage level based on the system context, if available, as described in relation to FIG. 5.

At operation 406, the target diagnostic coverage level satisfaction component 106 determines whether the realized diagnostic coverage level satisfies a target diagnostic coverage level. For example, the target diagnostic coverage level satisfaction component 106 compares the realized diagnostic coverage level determined by the diagnostic coverage determination component 104 to the target diagnostic coverage level.

Figure 5:
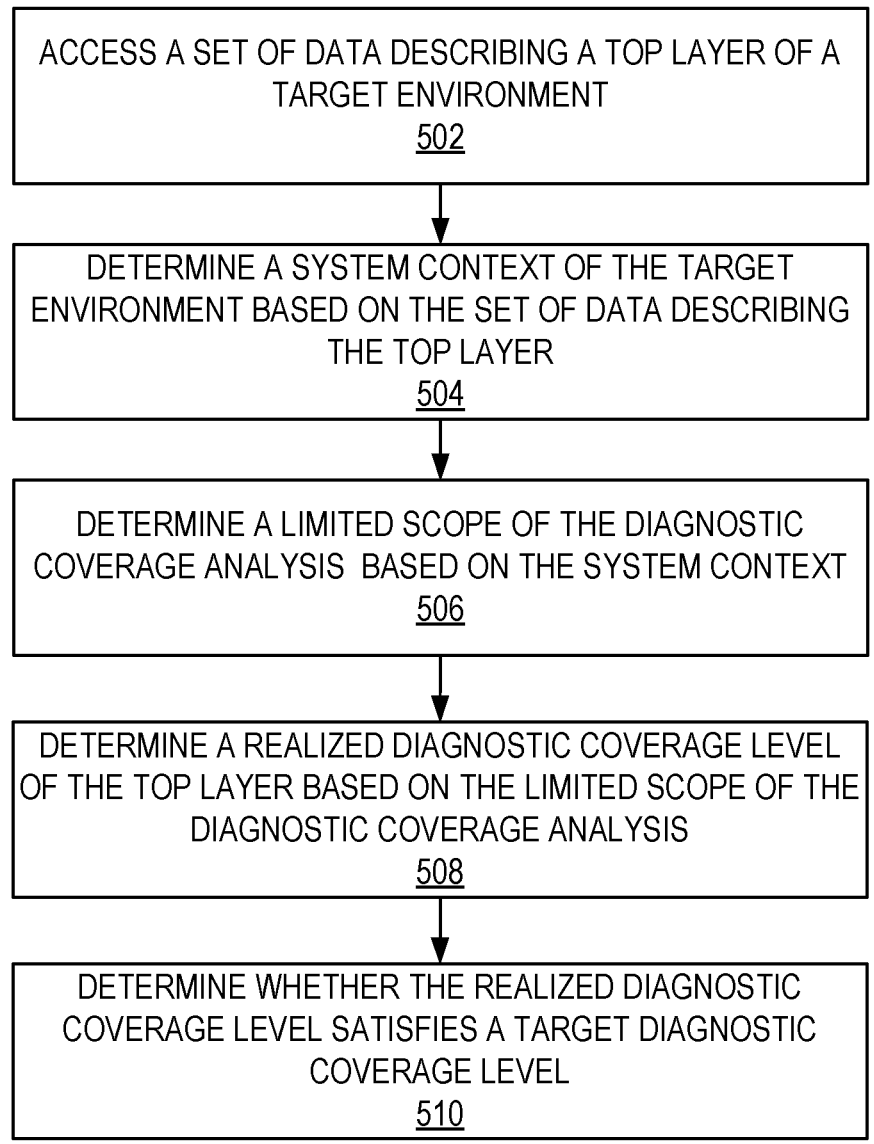
FIG. 5 is a flowchart showing a method for analyzing a top layer of a target environment based on system context, according to some example embodiments.

FIG. 5 is a flowchart showing a method 500 for analyzing a top layer of a target environment based on system context, according to some example embodiments. The method 500 may be embodied in computer readable instructions for execution by one or more processors such that the operations of the method 500 may be performed in part or in whole by receive the functional safety system 100; accordingly, the method 500 is described below by way of example with reference to the functional safety system 100. However, it shall be appreciated that at least some of the operations of the method 500 may be deployed on various other hardware and/or software configurations and the method 500 is not intended to be limited to the functional safety system 100.

At operation 502, the data accessing component 102 accesses a set of data describing a top layer of a target environment.

At operation 504, the system context constraint component 114 determines a system context of the target environment based on the set of data describing the top layer. For example, the system context constraint component 114 determines the requirements, design and application of the target environment, based on the set of data describing the top layer.

At operation 506, the diagnostic coverage determination component 104 determines a limited scope of the diagnostic coverage analysis based on the system context. The system context can be used to limit the scope of a diagnostic coverage analysis based on the particular application. For example, the system context can be used to limit the scope of the diagnostic coverage analysis to the portions of the target environment that are used within the given application. To determine the limited scope of the diagnostic coverage analysis, the system context constraint component 114 identifies any functions and/or IP that are not needed within the known system context of the target environment. The diagnostic coverage determination component 104 may then identify a subset of the target environment that is used within the given application, which may define the limited scope of the diagnostic coverage analysis.

At operation 508, diagnostic coverage determination component 104 determines a realized diagnostic coverage level of the top level based on the limited scope of the diagnostic coverage analysis. For example, the realized diagnostic coverage level of the top level is determined based on the system context can be used to limit the scope of a diagnostic coverage analysis based on the subset of the target environment that is used within the given application.

At operation 510, the target diagnostic coverage level satisfaction component 106 determines whether the realized diagnostic coverage level satisfies a target diagnostic coverage level. For example, the target diagnostic coverage level satisfaction component 106 compares the realized diagnostic coverage level determined by the diagnostic coverage determination component 104 to the target diagnostic coverage level.

Figure 6:
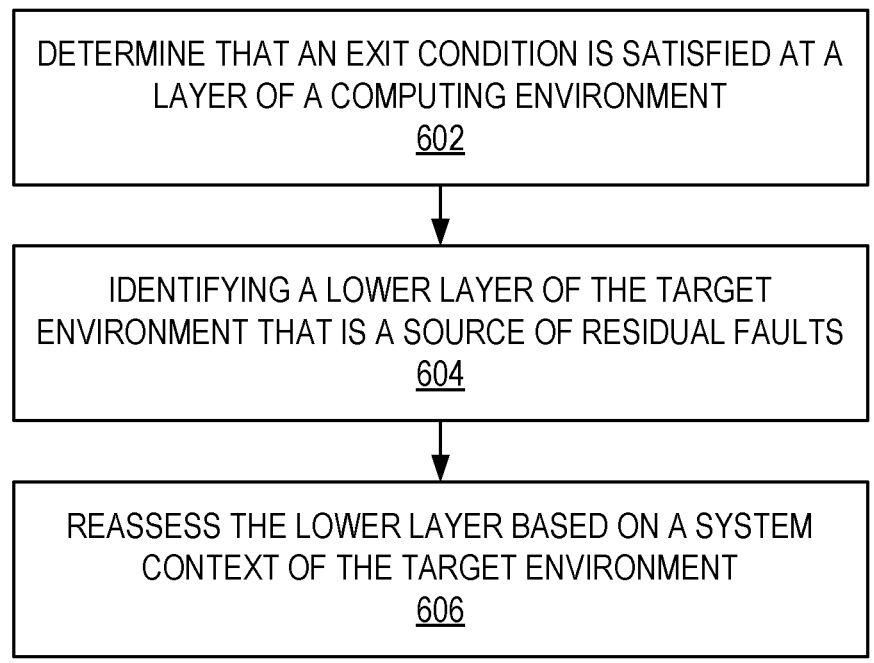
FIG. 6 is a flowchart showing a method of applying system context to lower layers of a target environment, according to some example embodiments.

FIG. 6 is a flowchart showing a method 600 of applying system context to lower layers of a target environment, according to some example embodiments. The method 600 may be embodied in computer readable instructions for execution by one or more processors such that the operations of the method 600 may be performed in part or in whole by a functional safety system 100; accordingly, the method 600 is described below by way of example with reference to the functional safety system 100. However, it shall be appreciated that at least some of the operations of the method 600 may be deployed on various other hardware and/or software configurations and the method 600 is not intended to be limited to the functional safety system 100.

At operation 602, the additional safety mechanism identification component 108 determines that an exit condition has been satisfied at a layer of a target environment. For example, the exit condition may be a specified time period elapsing (e.g., a timeout), a determination that all additional safety mechanisms have been exhausted, and/or that addition of additional safety mechanisms will not increase the diagnostic coverage level beyond a predetermined threshold. For example, the threshold may indicate a minimum level of effectiveness at increasing the realized diagnostic coverage level At operation 604, the residual fault determination component 112 identifies a lower layer of the target environment that is a source of residual faults. For example, the residual fault determination component 112 can identify the source layer of the residual faults based on tracking the layers at which the residual fault was introduced and/or based on a provided input file.

At operation 606, the functional safety system 100 reassesses the lower layer based on a system context of the target environment. For example, the lower layer can be reassessed based on a limited scope of a diagnostic coverage analysis that is determined based on the system context.

Figure 7:
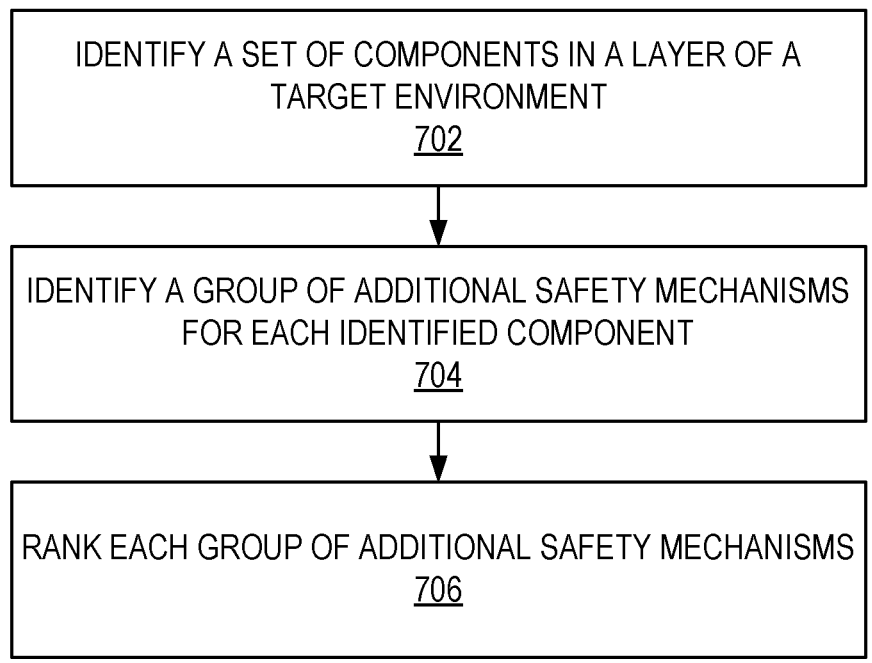
FIG. 7 is a flowchart showing a method of identifying and ranking groups of additional safety mechanisms, according to some example embodiments.

FIG. 7 is a flowchart showing a method 700 of identifying and ranking groups of additional safety mechanisms, according to some example embodiments. The method 700 may be embodied in computer readable instructions for execution by one or more processors such that the operations of the method 700 may be performed in part or in whole by a functional safety system 100; accordingly, the method 700 is described below by way of example with reference to the functional safety system 100. However, it shall be appreciated that at least some of the operations of the method 700 may be deployed on various other hardware and/or software configurations and the method 700 is not intended to be limited to the functional safety system 100.

At operation 702, the additional safety mechanism identification component 108 identifies a set of components in a layer of a target environment. A component of the layer can be a part or subpart of the layer. Examples of parts of the layer include residual inputs, storage elements, processors, finite state machines, interconnects and datapaths, clocking, and the like. Some parts of the layer may include subparts. For example, storage elements may include subparts such as SRAM, regfiles, TCAM, FIFOs, configuration registers, and the like.

At operation 704, the additional safety mechanism identification component 108 identifies a group of additional safety mechanisms for each identified component. The additional safety mechanism identification component 108 may identify the additional safety mechanisms using various techniques. In some embodiments, the additional safety mechanism identification component 108 may use machine learning/artificial intelligence techniques to identify the additional safety mechanisms. For example, a machine learning model may be trained based on data sets defining target environments that satisfy strict diagnostic coverage levels. The additional safety mechanism identification component 108 may use data defining a target environment, layer of a target environment, residual faults at a lower layer, and/or the context of the target environment as input into the machine learning model. In turn, the machine learning model may provide an output identifying the safety mechanisms with the highest likelihood of increasing diagnostic coverage level of the layer.

As another example, the additional safety mechanism identification component 108 may identify the additional safety mechanism using pattern matching techniques, such as by matching safety mechanism to known patterns or individual components included in the layer. For example, the additional safety mechanism identification component 108 may maintain a list of additional functional safety mechanisms and locations and/or components to which the safety mechanisms can be effectively implemented. Accordingly, the additional safety mechanism identification component 108 identifies components that are included in the layer of the target environment and then identifies the additional functional safety mechanisms mapped to the identified components in the list of additional functional safety mechanisms.

At operation 706, the additional safety mechanism identification component 108 ranks each group of additional safety mechanisms. Each group of additional safety mechanisms may be ranked based on the same set or different sets of parameters.

Figure 8:
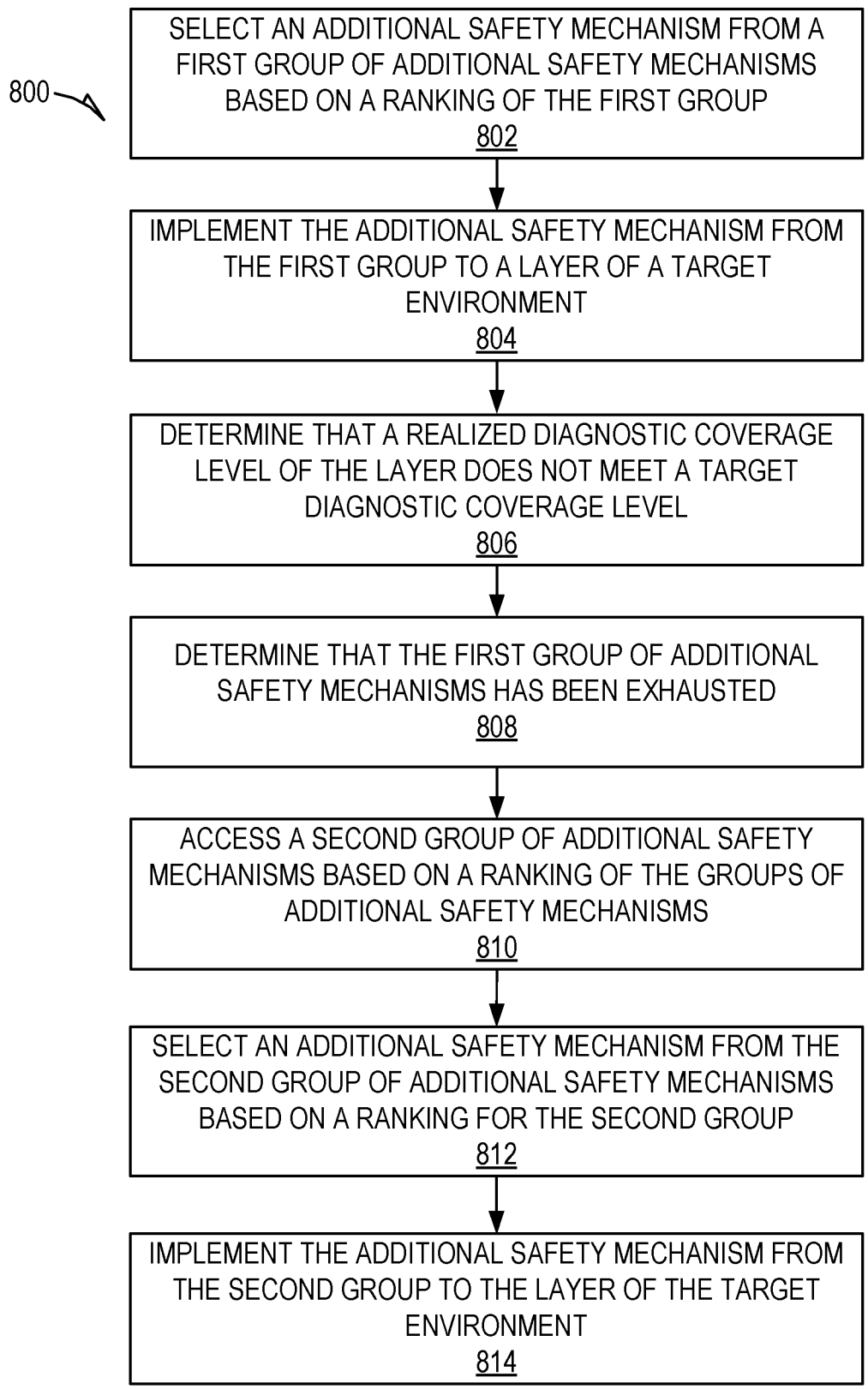
FIG. 8 is a flowchart showing a method of implementing groups of additional safety mechanisms, according to some example embodiments.

FIG. 8 is a flowchart showing a method 800 of implementing groups of additional safety mechanisms, according to some example embodiments. The method 800 may be embodied in computer readable instructions for execution by one or more processors such that the operations of the method 800 may be performed in part or in whole by a functional safety system 100; accordingly, the method 800 is described below by way of example with reference to the functional safety system 100. However, it shall be appreciated that at least some of the operations of the method 800 may be deployed on various other hardware and/or software configurations and the method 800 is not intended to be limited to the functional safety system 100.

At operation 802, the additional safety mechanism integration component 110 selects an additional safety mechanism from a first group of additional safety mechanisms based on a ranking of the first group. The group of additional safety mechanisms corresponds to an identified component in the layer of the target environment. The additional safety mechanism identification component 108 may categorize additional safety mechanisms into groups corresponding to components in the target environment. Each group of additional safety mechanisms can be ranked separately. Accordingly, the additional safety mechanism integration component 110 selects the additional safety mechanism from the first group of additional safety mechanisms based on the ranking determined for the first group At operation 804, the additional safety mechanism integration component 110 implements the additional safety mechanism from the first group to a layer of a target environment.

At operation 806, the target diagnostic coverage level satisfaction component 106 determines that a realized diagnostic coverage level of the layer does not meet a target diagnostic coverage level.

At operation 808, the additional safety mechanism identification component 108 determines that the first group of additional safety mechanisms has been exhausted. For example, the additional safety mechanism identification component 108 determines that all of the additional safety mechanisms in the first group have been added to the layer of the target environment.

At operation 810, the additional safety mechanism identification component 108 accesses a second group of additional safety mechanisms based on a ranking of the groups of additional safety mechanisms. The second group of additional safety mechanisms corresponds to a different component of the layer of the target environment. The group of additional safety mechanisms is ranked and the additional safety mechanism identification component 108 provides each group of additional safety mechanisms to the additional safety mechanism integration component 110 based on the ranking. For example, the additional safety mechanism identification component 108 provides each subsequent group of additional safety mechanisms to the additional safety mechanism integration component 110 to the additional safety mechanism integration component 110 upon the previous group of additional safety mechanisms being exhausted.

At operation 812, the additional safety mechanism integration component 110 selects an additional safety mechanism from the second group of additional safety mechanisms based on a ranking for the second group. The ranking for the second group is different than the ranking for the first group. Further, the ranking for the second group and the first group may be determined based on the same or different parameters.

At operation 814, the additional safety mechanism integration component 110 implements the additional safety mechanism from the second group to the layer of the target environment.

Figure 9:
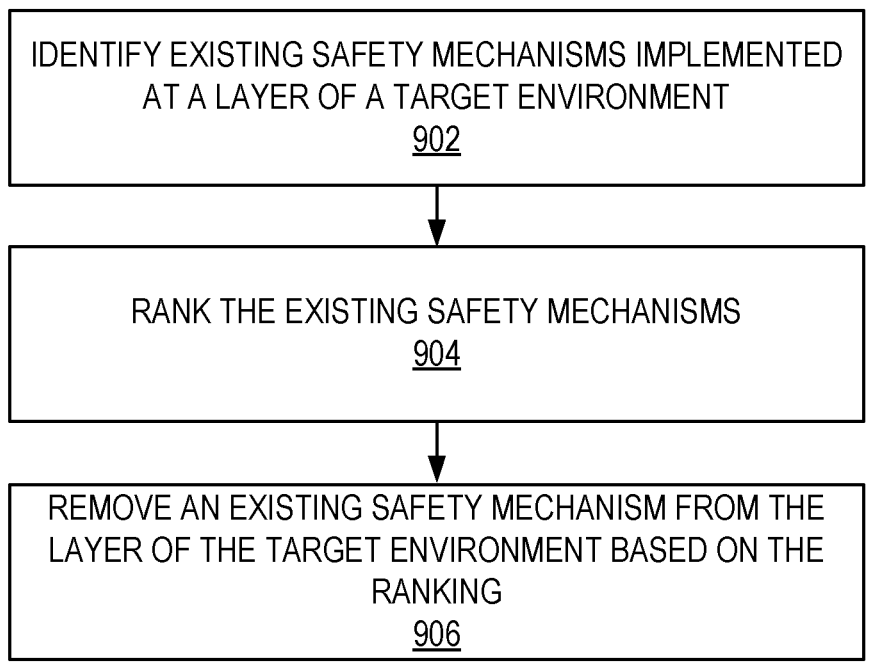
FIG. 9 is a flowchart showing a method of optimizing existing safety mechanisms based on a ranking, according to some example embodiments.

FIG. 9 is a flowchart showing a method 900 of optimizing existing safety mechanisms based on a ranking, according to some example embodiments. The method 900 may be embodied in computer readable instructions for execution by one or more processors such that the operations of the method 900 may be performed in part or in whole by a functional safety system 100; accordingly, the method 900 is described below by way of example with reference to the functional safety system 100. However, it shall be appreciated that at least some of the operations of the method 900 may be deployed on various other hardware and/or software configurations and the method 900 is not intended to be limited to the functional safety system 100.

At operation 902, the diagnostic coverage determination component 104 identifies existing safety mechanisms implemented at a layer of a target environment. The diagnostic coverage determination component 104 determines the existing safety mechanisms based on a set of data describing the layer of the target environment and, optionally, data describing residual faults at a lower layer of the target environment and/or the context of the target environment. For example, the diagnostic coverage determination component 104 can identify the safety mechanisms implemented at the layer by using machine learning/artificial intelligence techniques based on known standard functional safety coverage mechanisms, patterns, and key words or being supplied a list of the layer's functional safety mechanisms and locations.

At operation 904, the optimization component 116 ranks the existing safety mechanisms. The optimization component 116 may rank the safety mechanisms that have been implemented at a layer of the target environment based on a set of parameters. The parameters may indicate a preference for achieving specified goals, such as higher efficiency (e.g., coverage versus cost), increased coverage, reduced cost, reduced area, and the like. In some embodiments, the parameters may indicate weight values to apply to each of the specified goals. For example, the parameters may indicate a higher preference towards a specified goal, such as increased coverage, resulting in a higher weight being applied to the specified goal when ranking the additional safety mechanisms. Alternatively, or additionally, the parameters may indicate a lower preference towards a specified goal, such as reducing area, resulting in a lower weight being applied to the specified goal when ranking the additional safety mechanisms. The cost associated with an additional safety mechanism may be based on one or more factors, such as power consumption, physical size, gate count, clock period increase, and the like.

At operation 906, the optimization component 116 removes an existing safety mechanism from the layer of the target environment based on the ranking. For example, the optimization component 116 may remove the lowest ranked safety mechanisms.

Figure 10:
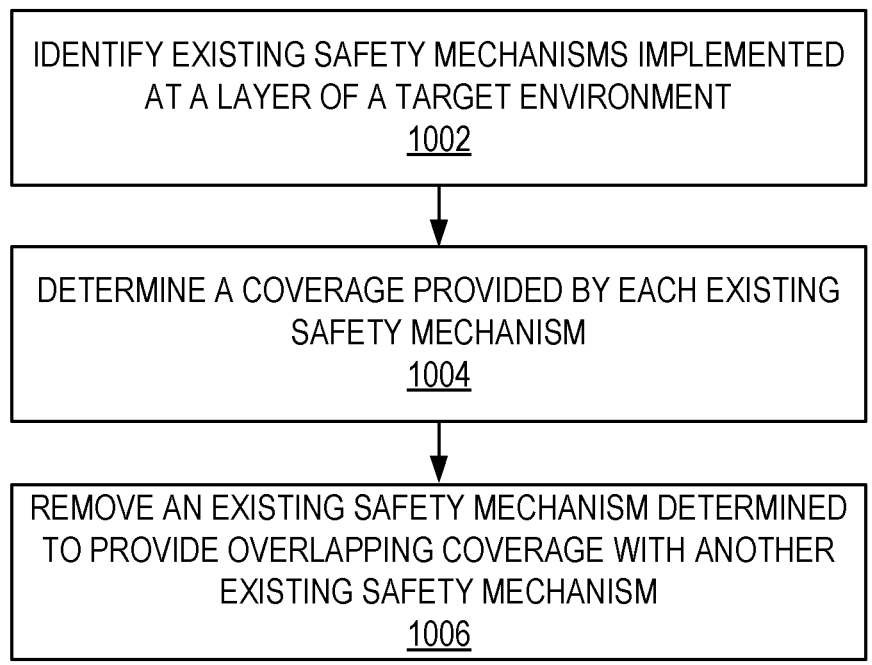
FIG. 10 is a flowchart showing a method of optimizing existing safety mechanisms based on overlapping coverage, according to some example embodiments.

FIG. 10 is a flowchart showing a method 1000 of optimizing existing safety mechanisms based on overlapping coverage, according to some example embodiments. The method 1000 may be embodied in computer readable instructions for execution by one or more processors such that the operations of the method 1000 may be performed in part or in whole by a functional safety system 100; accordingly, the method 1000 is described below by way of example with reference to the functional safety system 100. However, it shall be appreciated that at least some of the operations of the method 1000 may be deployed on various other hardware and/or software configurations and the method 1000 is not intended to be limited to the functional safety system 100.

At operation 1002, the diagnostic coverage determination component 104 identifies existing safety mechanisms implemented at a layer of a target environment. The diagnostic coverage determination component 104 determines the existing safety mechanisms based on a set of data describing the layer of the target environment and, optionally, data describing residual faults at a lower layer of the target environment and/or the context of the target environment.

For example, the diagnostic coverage determination component 104 can identify the safety mechanisms implemented at the layer by using machine learning/artificial intelligence techniques based on known standard functional safety coverage mechanisms, patterns, and key words or being supplied a list of the layer's functional safety mechanisms and locations.

At operation 1004, the diagnostic coverage determination component 104 determines a coverage provided by each existing safety mechanism. For example, the diagnostic coverage determination component 104 determined the coverage using a formal cone of logic, by insertion of faults to determine if the safety mechanisms can detect the inserted faults, inputted coverage file, and/or other automated techniques.

At operation 1006, the optimization component 116 removes an existing safety mechanism determined to provide overlapping coverage with another existing safety mechanism. For example, the optimization component 116 may remove the overlapping safety mechanism determined to be less efficient.

Software Architecture

Figure 11:
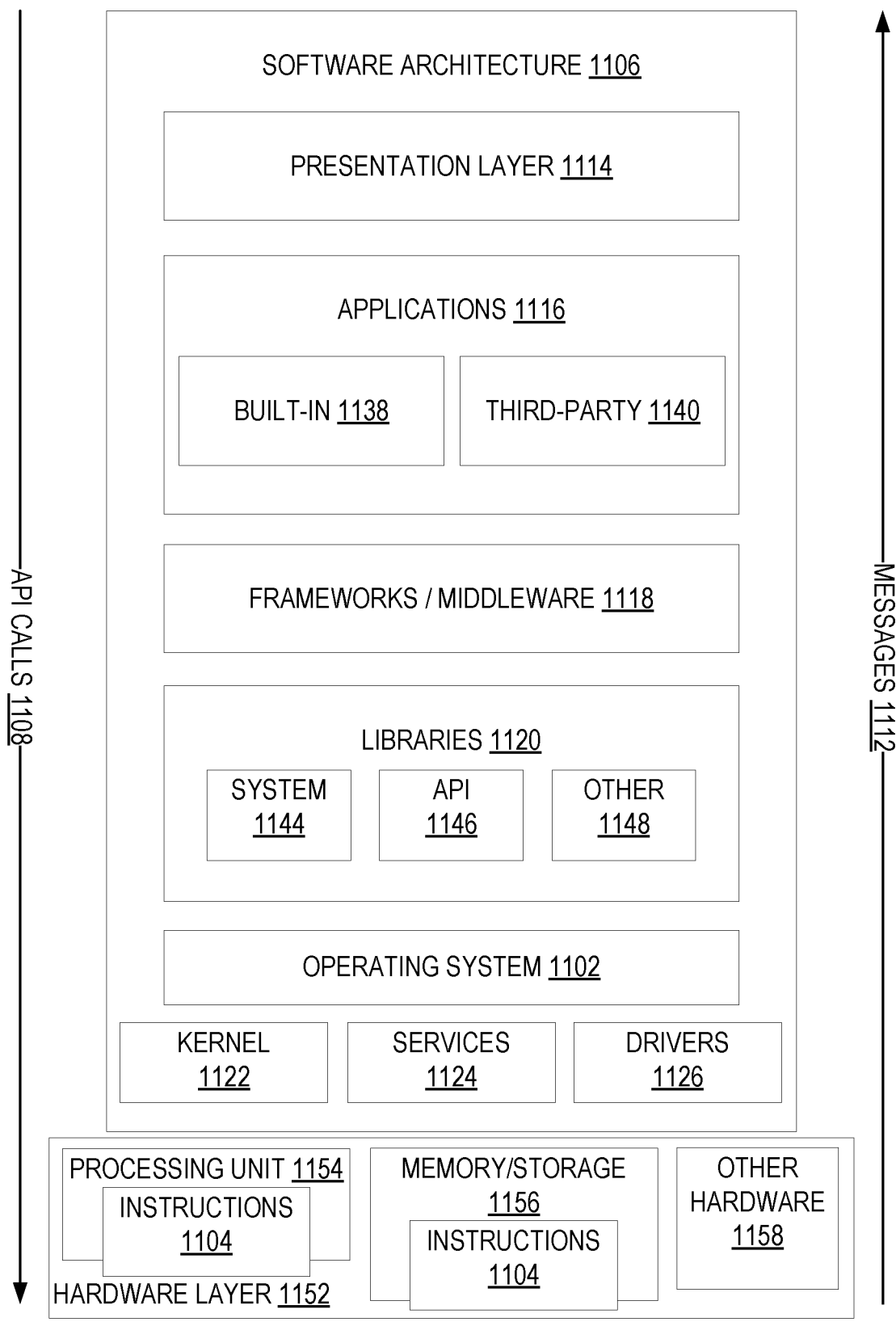
FIG. 11 is a block diagram illustrating an example software architecture, which may be used in conjunction with various hardware architectures herein described.

FIG. 11 is a block diagram illustrating an example software architecture 1106, which may be used in conjunction with various hardware architectures herein described. FIG. 11 is a non-limiting example of a software architecture 1106 and it will be appreciated that many other architectures may be implemented to facilitate the functionality described herein. The software architecture 1106 may execute on hardware such as machine 1200 of FIG. 12 that includes, among other things, processors 1204, memory 1214, and (input/output) I/O components 1218. A representative hardware layer 1152 is illustrated and can represent, for example, the machine 1200 of FIG. 12. The representative hardware layer 1152 includes a processing unit 1154 having associated executable instructions 1104. Executable instructions 1104 represent the executable instructions of the software architecture 1106, including implementation of the methods, components, and so forth described herein. The hardware layer 1152 also includes memory and/or storage modules 1156, which also have executable instructions 1104. The hardware layer 1152 may also comprise other hardware 1158.

In the example architecture of FIG. 11, the software architecture 1106 may be conceptualized as a stack of layers where each layer provides particular functionality, such as the Open Systems Interconnection model (OSI model). For example, the software architecture 1106 may include layers such as an operating system 1102, libraries 1120, frameworks/middleware 1118, applications 1116, and a presentation layer 1114. Operationally, the applications 1116 and/or other components within the layers may invoke application programming interface (API) calls 1108 through the software stack and receive a response such as messages 1112 in response to the API calls 1108. The layers illustrated are representative in nature and not all software architectures have all layers. For example, some mobile or special purpose operating systems may not provide a frameworks/middleware 1118, while others may provide such a layer. Other software architectures may include additional or different layers.

The operating system 1102 may manage hardware resources and provide common services. The operating system 1102 may include, for example, a kernel 1122, services 1124, and drivers 1126. The kernel 1122 may act as an abstraction layer between the hardware and the other software layers. For example, the kernel 1122 may be responsible for memory management, processor management (e.g., scheduling), component management, networking, security settings, and so on. The services 1124 may provide other common services for the other software layers. The drivers 1126 are responsible for controlling or interfacing with the underlying hardware. For instance, the drivers 1126 include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 1120 provide a common infrastructure that is used by the applications 1116 and/or other components and/or layers. The libraries 1120 provide functionality that allows other software components to perform tasks in an easier fashion than to interface directly with the underlying operating system 1102 functionality (e.g., kernel 1122, services 1124, and/or drivers 1126). The libraries 1120 may include system libraries 1144 (e.g., C standard library) that may provide functions such as memory allocation functions, string manipulation functions, mathematical functions, and the like. In addition, the libraries 1120 may include API libraries 1146 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1120 may also include a wide variety of other libraries 1148 to provide many other APIs to the applications 1116 and other software components/modules.

The frameworks/middleware 1118 (also sometimes referred to as middleware) provide a higher-level common infrastructure that may be used by the applications 1116 and/or other software components/modules. For example, the frameworks/middleware 1118 may provide various graphical user interface (GUI) functions, high-level resource management, high-level location services, and so forth. The frameworks/middleware 1118 may provide a broad spectrum of other APIs that may be used by the applications 1116 and/or other software components/modules, some of which may be specific to a particular operating system 1102 or platform.

The applications 1116 include built-in applications 1138 and/or third-party applications 1140. Examples of representative built-in applications 1138 may include, but are not limited to, a contacts application, a browser application, a book reader application, a location application, a media application, a messaging application, and/or a game application. Third-party applications 1140 may include an application developed using the ANDROID™ or IOS™ software development kit (SDK) by an entity other than the vendor of the particular platform, and may be mobile software running on a mobile operating system such as IOS™ ANDROID™, WINDOWS® Phone, or other mobile operating systems. The third-party applications 1140 may invoke the API calls 1108 provided by the mobile operating system (such as operating system 1102) to facilitate functionality described herein.

The applications 1116 may use built in operating system functions (e.g., kernel 1122, services 1124, and/or drivers 1126), libraries 1120, and frameworks/middleware 1118 to create UIs to interact with users of the system. Alternatively, or additionally, in some systems, interactions with a user may occur through a presentation layer, such as presentation layer 1114. In these systems, the application/component "logic" can be separated from the aspects of the application/component that interact with a user.

FIG. 12 is a block diagram illustrating components of a machine 1200, according to some example embodiments, able to read instructions 1104 from a machine-readable medium (e.g., a machine-readable storage medium) and perform any one or more of the methodologies discussed herein. Specifically, FIG. 12 shows a diagrammatic representation of the machine 1200 in the example form of a computer system, within which instructions 1210 (e.g., software, a program, an application, an applet, an app, or other executable code) for causing the machine 1200 to perform any one or more of the methodologies discussed herein may be executed. As such, the instructions 1210 may be used to implement modules or components described herein. The instructions 1210 transform the general, non-programmed machine 1200 into a particular machine 1200 programmed to carry out the described and illustrated functions in the manner described. In alternative embodiments, the machine 1200 operates as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine 1200 capable of executing the instructions 1210, sequentially or otherwise, that specify actions to be taken by machine 1200. Further, while only a single machine 1200 is illustrated, the term "machine" shall also be taken to include a collection of machines that individually or jointly execute the instructions 1210 to perform any one or more of the methodologies discussed herein.

The machine 1200 may include processors 1204, memory/storage 1206, and I/O components 1218, which may be configured to communicate with each other such as via a bus 1202. The memory/storage 1206 may include a memory 1214, such as a main memory, or other memory storage, and a storage unit 1216, both accessible to the processors 1204 such as via the bus 1202. The storage unit 1216 and memory 1214 store the instructions 1210 embodying any one or more of the methodologies or functions described herein. The instructions 1210 may also reside, completely or partially, within the memory 1214, within the storage unit 1216, within at least one of the processors 1204 (e.g., within the processor's cache memory), or any suitable combination thereof, during execution thereof by the machine 1200. Accordingly, the memory 1214, the storage unit 1216, and the memory of processors 1204 are examples of machine-readable media.

The I/O components 1218 may include a wide variety of components to receive input, provide output, produce output, transmit information, exchange information, capture measurements, and so on. The specific I/O components 1218 that are included in a particular machine 1200 will depend on the type of machine. For example, portable machines such as mobile phones will likely include a touch input device or other such input mechanisms, while a headless server machine will likely not include such a touch input device. It will be appreciated that the I/O components 1218 may include many other components that are not shown in FIG. 12. The I/O components 1218 are grouped according to functionality merely for simplifying the following discussion and the grouping is in no way limiting. In various example embodiments, the I/O components 1218 may include output components 1226 and input components 1228. The output components 1226 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1228 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1218 may include biometric components 1230, motion components 1234, environmental components 1236, or position components 1238 among a wide array of other components. For example, the biometric components 1230 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1234 may include acceleration sensor components (e.g., accelerometer), gravitation sensor components, rotation sensor components (e.g., gyroscope), and so forth. The environmental components 1236 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1238 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1218 may include communication components 1240 operable to couple the machine 1200 to a network 1232 or devices 1220 via coupling 1224 and coupling 1222, respectively. For example, the communication components 1240 may include a network interface component or other suitable device to interface with the network 1232. In further examples, communication components 1240 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1220 may be another machine or any of a wide variety of peripheral devices (e.g., a peripheral device coupled via a USB).

Moreover, the communication components 1240 may detect identifiers or include components operable to detect identifiers. For example, the communication components 1240 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1240 such as location via Internet Protocol (IP) geo-location, location via Wi-Fi® signal triangulation, location via detecting a NFC beacon signal that may indicate a particular location, and so forth.

GLOSSARY

"CARRIER SIGNAL" in this context refers to any intangible medium that is capable of storing, encoding, or carrying instructions 1210 for execution by the machine 1200, and includes digital or analog communications signals or other intangible medium to facilitate communication of such instructions 1210. Instructions 1210 may be transmitted or received over the network 1232 using a transmission medium via a network interface device and using any one of a number of well-known transfer protocols.

"CLIENT DEVICE" in this context refers to any machine 1200 that interfaces to a communications network 1232 to obtain resources from one or more server systems or other client devices. A client device may be, but is not limited to, mobile phones, desktop computers, laptops, PDAs, smart phones, tablets, ultra books, netbooks, laptops, multi-processor systems, microprocessor-based or programmable consumer electronics, game consoles, STBs, or any other communication device that a user may use to access a network 1232.

"COMMUNICATIONS NETWORK" in this context refers to one or more portions of a network 1232 that may be an ad hoc network, an intranet, an extranet, a virtual private network (VPN), a LAN, a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 1232 or a portion of a network 1232 may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions 1210 and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store instructions 1210. The term "machine-readable medium" shall also be taken to include any medium, or combination of multiple media, that is capable of storing instructions 1210 (e.g., code) for execution by a machine 1200, such that the instructions 1210, when executed by one or more processors 1204 of the machine 1200, cause the machine 1200 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors 1204) may be configured by software (e.g., an application 1116 or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor 1204 or other programmable processor 1204. Once configured by such software, hardware components become specific machines 1200 (or specific components of a machine 1200) uniquely tailored to perform the configured functions and are no longer general-purpose processors 1204. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor 1204 configured by software to become a special-purpose processor, the general-purpose processor 1204 may be configured as respectively different special-purpose processors (e.g., comprising different hardware components) at different times. Software accordingly configures a particular processor or processors 1204, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses 1202) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors 1204 that are temporarily configured (e.g., by software) or permanently configured to perform the relevant operations. Whether temporarily or permanently configured, such processors 1204 may constitute processor-implemented components that operate to perform one or more operations or functions described herein. As used herein, "processor-implemented component" refers to a hardware component implemented using one or more processors 1204. Similarly, the methods described herein may be at least partially processor-implemented, with a particular processor or processors 1204 being an example of hardware. For example, at least some of the operations of a method may be performed by one or more processors 1204 or processor-implemented components. Moreover, the one or more processors 1204 may also operate to support performance of the relevant operations in a "cloud computing" environment or as a "software as a service" (SaaS). For example, at least some of the operations may be performed by a group of computers (as examples of machines 1200 including processors 1204), with these operations being accessible via a network 1232 (e.g., the Internet) and via one or more appropriate interfaces (e.g., an API). The performance of certain of the operations may be distributed among the processors 1204, not only residing within a single machine 1200, but deployed across a number of machines 1200. In some example embodiments, the processors 1204 or processor-implemented components may be located in a single geographic location (e.g., within a home environment, an office environment, or a server farm). In other example embodiments, the processors 1204 or processor-implemented components may be distributed across a number of geographic locations.

"PROCESSOR" in this context refers to any circuit or virtual circuit (a physical circuit emulated by logic executing on an actual processor 1204) that manipulates data values according to control signals (e.g., "commands," "op codes," "machine code," etc.) and which produces corresponding output signals that are applied to operate a machine 1200. A processor 1204 may be, for example, a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC) or any combination thereof. A processor 1204 may further be a multi-core processor having two or more independent processors 1204 (sometimes referred to as "cores") that may execute instructions 1210 contemporaneously.

What is claimed is:
1. A method comprising:
 determining a first realized diagnostic coverage level of a target environment based on a first set of data describing a first layer of the target environment implemented with a set of existing safety mechanisms;
 determining that the first realized diagnostic coverage level is less than a target diagnostic coverage level for the target environment;
 identifying a first set of additional safety mechanisms that can be implemented at the first layer of the target environment;
 ranking the first set of additional safety mechanisms;
 selecting a first additional safety mechanism from the first set of additional safety mechanisms based on the ranking of the first set of additional safety mechanisms; and
 determining a second realized diagnostic coverage level of the target environment based on a second set of data describing the first layer of the target environment implemented with the set of existing safety mechanisms and the first additional safety mechanism.

2. The method of claim 1, further comprising:
 determining that the second realized diagnostic coverage level is less than the target diagnostic coverage level for the target environment;
 selecting a second additional safety mechanism from the first set of additional safety mechanisms based on the ranking of the first set of additional safety mechanisms;
 determining a third realized diagnostic coverage level of the target environment based on a third set of data describing the first layer of the target environment implemented with the set of existing safety mechanisms, the first additional safety mechanism, and the second additional safety mechanism; and determining whether the third realized diagnostic coverage level meets the target diagnostic coverage level for the target environment.

3. The method of claim 1, further comprising:
determining that the second realized diagnostic coverage level is less than the target diagnostic coverage level for the target environment;
determining that the first set of additional safety mechanisms have been exhausted; and
determining a third realized diagnostic coverage level of the target environment based on a third set of data describing a second layer of the target environment and first fault data describing residual faults of the first layer implemented with the set of existing safety mechanisms and the first additional safety mechanism, the second layer being higher than the first layer in the target environment.

4. The method of claim 3, further comprising:
determining that the third realized diagnostic coverage level is less than the target diagnostic coverage level for the target environment;
identifying a second set of additional safety mechanisms that can be implemented at the second layer of the target environment;
ranking the second set of additional safety mechanisms;
selecting a second additional safety mechanism from the second set of additional safety mechanisms based on the ranking of the second set of additional safety mechanisms; and
determining a fourth realized diagnostic coverage level of the target environment based on a fourth set of data describing the second layer of the target environment implemented with the second additional safety mechanism and the first fault data describing residual faults of the first layer implemented with the set of existing safety mechanisms and the first additional safety mechanism.

5. The method of claim 1, further comprising:
ranking the set of existing safety mechanisms based on a respective coverage level and a respective cost of each safety mechanism in the set of existing safety mechanisms; and
removing at least one safety mechanism from the set of existing safety mechanisms based on the ranking of the set of existing safety mechanisms, yielding a modified set of existing safety mechanisms implemented at the first layer, wherein the first realized diagnostic coverage level of the target environment is determined based on the modified set of existing safety mechanisms.

6. The method of claim 1, wherein identifying the first set of additional safety mechanisms that can be implemented at the first layer of the target environment comprises:
determining, based on the first set of data describing the first layer of the target environment, a set of components included in the first layer of the target environment; and
for each respective component in the set of components, identifying a set of safety mechanisms mapped to the respective component.

7. The method of claim 6, wherein ranking the first set of additional safety mechanisms comprises:
ranking a first set of safety mechanisms mapped to a first component from the set of components included in the first layer of the target environment, yielding a first ranking; and
ranking a second set of safety mechanisms mapped to a second component from the set of components included in the first layer of the target environment, yielding a second ranking.

8. The method of claim 7, further comprising:
determining that the second realized diagnostic coverage level is less than the target diagnostic coverage level for the target environment;
determining that the first set of safety mechanisms have been exhausted; and
applying a second additional safety mechanisms from the second set of safety mechanisms based on the second ranking.

9. The method of claim 1, wherein the target environment includes at least one Safety Element out of Context (SEooC) component.

10. A system comprising:
one or more computer processors; and
one or more computer-readable mediums storing instructions that, when executed by the one or more computer processors, cause the system to perform operations comprising:
determining a first realized diagnostic coverage level of a target environment based on a first set of data describing a first layer of the target environment implemented with a set of existing safety mechanisms;
determining that the first realized diagnostic coverage level is less than a target diagnostic coverage level for the target environment;
identifying a first set of additional safety mechanisms that can be implemented at the first layer of the target environment;
ranking the first set of additional safety mechanisms;
selecting a first additional safety mechanism from the first set of additional safety mechanisms based on the ranking of the first set of additional safety mechanisms; and
determining a second realized diagnostic coverage level of the target environment based on a second set of data describing the first layer of the target environment implemented with the set of existing safety mechanisms and the first additional safety mechanism.

11. The system of claim 10, the operations further comprising:
determining that the second realized diagnostic coverage level is less than the target diagnostic coverage level for the target environment;
selecting a second additional safety mechanism from the first set of additional safety mechanisms based on the ranking of the first set of additional safety mechanisms;
determining a third realized diagnostic coverage level of the target environment based on a third set of data describing the first layer of the target environment implemented with the set of existing safety mechanisms, the first additional safety mechanism, and the second additional safety mechanism; and
determining whether the third realized diagnostic coverage level meets the target diagnostic coverage level for the target environment.

12. The system of claim 10, the operations further comprising:
determining that the second realized diagnostic coverage level is less than the target diagnostic coverage level for the target environment;
determining that the first set of additional safety mechanisms have been exhausted; and
determining a third realized diagnostic coverage level of the target environment based on a third set of data describing a second layer of the target environment and first fault data describing residual faults of the first layer implemented with the set of existing safety mechanisms and the first additional safety mechanism, the second layer being higher than the first layer in the target environment.

13. The system of claim 12, the operations further comprising:
   determining that the third realized diagnostic coverage level is less than the target diagnostic coverage level for the target environment;
   identifying a second set of additional safety mechanisms that can be implemented at the second layer of the target environment;
   ranking the second set of additional safety mechanisms;
   selecting a second additional safety mechanism from the second set of additional safety mechanisms based on the ranking of the second set of additional safety mechanisms; and
   determining a fourth realized diagnostic coverage level of the target environment based on a fourth set of data describing the second layer of the target environment implemented with the second additional safety mechanism and the first fault data describing residual faults of the first layer implemented with the set of existing safety mechanisms and the first additional safety mechanism.

14. The system of claim 10, the operations further comprising:
   ranking the set of existing safety mechanisms based on a respective coverage level and a respective cost of each safety mechanism in the set of existing safety mechanisms; and
   removing at least one safety mechanism from the set of existing safety mechanisms based on the ranking of the set of existing safety mechanisms, yielding a modified set of existing safety mechanisms implemented at the first layer, wherein the first realized diagnostic coverage level of the target environment is determined based on the modified set of existing safety mechanisms.

15. The system of claim 10, wherein identifying the first set of additional safety mechanisms that can be implemented at the first layer of the target environment comprises:
   determining, based on the first set of data describing the first layer of the target environment, a set of components included in the first layer of the target environment; and
   for each respective component in the set of components, identifying a set of safety mechanisms mapped to the respective component.

16. The system of claim 15, wherein ranking the first set of additional safety mechanisms comprises:
   ranking a first set of safety mechanisms mapped to a first component from the set of components included in the first layer of the target environment, yielding a first ranking; and
   ranking a second set of safety mechanisms mapped to a second component from the set of components included in the first layer of the target environment, yielding a second ranking.

17. The system of claim 16, the operations further comprising:
   determining that the second realized diagnostic coverage level is less than the target diagnostic coverage level for the target environment;
   determining that the first set of safety mechanisms have been exhausted; and
   applying a second additional safety mechanisms from the second set of safety mechanisms based on the second ranking.

18. The system of claim 10, wherein the target environment includes at least one Safety Element out of Context (SEooC) component.

19. A non-transitory computer-readable medium storing instructions that, when executed by one or more computer processors of one or more computing devices, cause the one or more computing devices to perform operations comprising:
   determining a first realized diagnostic coverage level of a target environment based on a first set of data describing a first layer of the target environment implemented with a set of existing safety mechanisms;
   determining that the first realized diagnostic coverage level is less than a target diagnostic coverage level for the target environment;
   identifying a first set of additional safety mechanisms that can be implemented at the first layer of the target environment;
   ranking the first set of additional safety mechanisms;
   selecting a first additional safety mechanism from the first set of additional safety mechanisms based on the ranking of the first set of additional safety mechanisms; and
   determining a second realized diagnostic coverage level of the target environment based on a second set of data describing the first layer of the target environment implemented with the set of existing safety mechanisms and the first additional safety mechanism.

20. The non-transitory computer-readable medium of claim 19, the operations further comprising:
   determining that the second realized diagnostic coverage level is less than the target diagnostic coverage level for the target environment;
   selecting a second additional safety mechanism from the first set of additional safety mechanisms based on the ranking of the first set of additional safety mechanisms;
   determining a third realized diagnostic coverage level of the target environment based on a third set of data describing the first layer of the target environment implemented with the set of existing safety mechanisms, the first additional safety mechanism, and the second additional safety mechanism; and
   determining whether the third realized diagnostic coverage level meets the target diagnostic coverage level for the target environment.

* * * * *